(12) United States Patent
Gou et al.

(10) Patent No.: US 12,454,251 B2
(45) Date of Patent: Oct. 28, 2025

(54) END COVER ASSEMBLY, AIR CYLINDER, TREAD CLEANER AND RAILWAY VEHICLE

(71) Applicants: CRRC CHANGZHOU TECH-MARK INDUSTRIAL CO., LTD., Jiangsu (CN); CRRC QISHUYAN INSTITUTE CO., LTD., Jiangsu (CN)

(72) Inventors: Qingbing Gou, Jiangsu (CN); Anxu Wu, Jiangsu (CN); Chang Feng, Jiangsu (CN); Yuchen Zhang, Jiangsu (CN); Bo Wu, Jiangsu (CN); Hao Xu, Jiangsu (CN); Zichen Wang, Jiangsu (CN); Xun Chen, Jiangsu (CN); Dongdong Wang, Jiangsu (CN); Meng Wan, Jiangsu (CN)

(73) Assignees: CRRC CHANGZHOU TECH-MARK INDUSTRIAL CO., LTD., Jiangsu (CN); CRRC QISHUYAN INSTITUTE CO., LTD., Jiangsu (CN)

( * ) Notice: Subject to any disclaimer, the term of this patent is extended or adjusted under 35 U.S.C. 154(b) by 835 days.

(21) Appl. No.: 17/768,040

(22) PCT Filed: Oct. 9, 2020

(86) PCT No.: PCT/CN2020/120029
§ 371 (c)(1),
(2) Date: Apr. 11, 2022

(87) PCT Pub. No.: WO2021/068899
PCT Pub. Date: Apr. 15, 2021

(65) Prior Publication Data
US 2024/0092318 A1    Mar. 21, 2024

(30) Foreign Application Priority Data

Oct. 10, 2019 (CN) .......................... 201910957987.9
Oct. 23, 2019 (CN) .......................... 201911011446.3
(Continued)

(51) Int. Cl.
*B60S 1/68* (2006.01)
*B61C 15/08* (2006.01)

(52) U.S. Cl.
CPC ................ *B60S 1/68* (2013.01); *B61C 15/08* (2013.01)

(58) Field of Classification Search
CPC .................................... B60S 1/68; B61C 15/08
See application file for complete search history.

(56) References Cited

U.S. PATENT DOCUMENTS 3,238,982 A * 3/1966 Darr .................... G01M 17/021
                                                    157/14
2024/0092318 A1* 3/2024 Gou .......................... B60S 1/68

FOREIGN PATENT DOCUMENTS

CN    201083243 Y  *  7/2008
CN    102345652 A     2/2012
(Continued)

OTHER PUBLICATIONS

CNIPA Office Action for corresponding CN Application No. 201911066260.8; Issued Oct. 10, 2024.
(Continued)

*Primary Examiner* — Jason C Smith
(74) *Attorney, Agent, or Firm* — CANTOR COLBURN LLP

(57) ABSTRACT

An end cover assembly, an air cylinder, a tread sweeper and a railway vehicle.

22 Claims, 10 Drawing Sheets

(30) Foreign Application Priority Data

| Oct. 23, 2019 | (CN) | 201921786241.8 |
|---|---|---|
| Nov. 4, 2019 | (CN) | 201911066237.9 |
| Nov. 4, 2019 | (CN) | 201911066260.8 |
| Nov. 4, 2019 | (CN) | 201921882362.2 |

(56) References Cited

FOREIGN PATENT DOCUMENTS

| | | | | |
|---|---|---|---|---|
| CN | 102713333 | A | 10/2012 | |
| CN | 202847724 | U | 4/2013 | |
| CN | 203115244 | U | 8/2013 | |
| CN | 103318221 | A | 9/2013 | |
| CN | 103754203 | A | 4/2014 | |
| CN | 104442895 | A | 3/2015 | |
| CN | 104454757 | A * | 3/2015 | F15B 15/1438 |
| CN | 104994825 | A | 10/2015 | |
| CN | 105172828 | A | 12/2015 | |
| CN | 105736357 | A | 7/2016 | |
| CN | 206383938 | U | 8/2016 | |
| CN | 106638188 | A | 5/2017 | |
| CN | 206327382 | U | 7/2017 | |
| CN | 206383970 | U | 8/2017 | |
| CN | 206385406 | U | 8/2017 | |
| CN | 206598820 | U | 10/2017 | |
| CN | 209082416 | U | 7/2019 | |
| CN | 110497884 | A * | 11/2019 | |
| CN | 211335905 | U * | 8/2020 | B60S 1/68 |
| EP | 0844160 | A2 * | 5/1998 | |
| GB | 872098 | A | 7/1961 | |
| IN | 201109417 | Y | 9/2008 | |
| JP | 2002139082 | A | 5/2002 | |
| JP | 2005335559 | A * | 12/2005 | |
| JP | 3891719 | B2 * | 3/2007 | |
| JP | 2008207704 | A | 9/2008 | |
| JP | 2014172461 | A * | 9/2014 | |
| JP | 2016147592 | A * | 8/2016 | |
| JP | 2018024391 | A * | 2/2018 | |
| JP | 7108520 | B2 * | 7/2022 | |
| KR | 100258509 | B1 * | 6/2000 | |
| KR | 20250012091 | A * | 1/2025 | |

OTHER PUBLICATIONS

CNIPA First Office Action for corresponding CN application No. 201911066260.8; Issued Apr. 24, 2024.

International Search Report for International Application No. PCT/CN2020/120029; Date of Mailing, Dec. 30, 2020.

CNIPA Office Action for corresponding CN Application No. 201910957987.9; Issued on Jan. 27, 2022.

* cited by examiner

END COVER ASSEMBLY, AIR CYLINDER, TREAD CLEANER AND RAILWAY VEHICLE

CROSS REFERENCE TO RELATED APPLICATIONS

This is the U.S. national stage of application No. PCT/CN2020/120029, filed on Oct. 9, 2020. Priority under 35 U.S.C. § 119(a) and 35 U.S.C. § 365(b) is claimed from Chinese Application Nos. CN201910957987.9, filed Oct. 10, 2019; CN201911011446.3 filed Oct. 23, 2019; CN201921786241.8 filed Oct. 23, 2019; CN201911066237.9 filed Nov. 4, 2019; CN201911066260.8 filed Nov. 4, 2019; and CN201921882362.2 filed Nov. 4, 2019, the disclosure of which are also incorporated herein by reference.

FIELD OF THE INVENTION

The present application relates to the field of railway vehicle equipment, relates to wheel tread cleaning for railway vehicles, and in particular to an end cover assembly, a cylinder and a gap adjustment device of a tread cleaner, a tread cleaner using a mounting base with a mounting and positioning function, and a railway vehicle.

BACKGROUND OF THE INVENTION

At present, railway vehicles have become one of the main means of transportation, and the operation safety of them has always attracted people's attention. The wheel is a component in the bogie that is easily out of shape. When the tread of the wheel has the appearance of out-of-roundness, scratches and low adhesion, the operation safety of the train will be directly affected. As one of the standard configurations of railway vehicle bogies, the tread cleaner can clean the wheel tread to achieve the functions of wheel-rail adhesion improving, wheel shape trimming, etc., thereby effectively improving the condition of the wheel tread, restraining the wheel tread out-of-roundness, preventing the wheels from slipping and idling, and effectively improving the braking performance and comfort of railway vehicles. This has been verified in actual use.

Tread cleaner mainly perform wheel cleaning by driving abrasive blocks (or referred to as "grinders") close to the wheel tread and driving the abrasive blocks away from the wheel tread after the cleaning work is completed, so as to not affect its operation. At present, pneumatic devices are usually used to drive the movement and positioning of the abrasive blocks. The end of such a pneumatic device needs to be provided with an end cover assembly to provide the function of letting gas in and out. At present, the air inlet structure at the rear of the tread cleaner is single, which adopts the means of end face seal. The degree of sealing depends entirely on the degree of compression between the components, and the sealing effect is relatively poor. This will, when the abrasive block is pneumatically driven to abut against the wheel tread, directly affect the contact pressure between the two, thereby affecting the cleaning effect. In addition, such a structure has a relatively large gap between the spring guide rail and the air core, so when a spring guide rod is being mounted, it is impossible to confirm whether it is mounted in place, which may lead to the phenomena of wrong mounting and others that directly makes the product cannot be used.

In addition, in the conventional tread cleaner, as the cylinder continuously drives the abrasive block to act on the wheel tread, the thickness of the abrasive block will gradually decrease, resulting in an increase in the gap distance between the abrasive block and the wheel tread. In order to keep the gap distance between the abrasive block and the wheel tread basically constant or within a predetermined range, the tread cleaner disclosed in the Chinese patent application 200720046476.4 entitled "Tread cleaner Gap Adjustment Device", the Chinese patent application 200720046475.X entitled "Tread cleaner" and the Chinese patent application 201821315907.7 entitled "Tread cleaner for High-speed Trains" etc. are provided with a gap adjustment device using a tooth-formed component to proactively adjust the gap between the abrasive block and the wheel tread.

In addition, during use, the tread cleaner needs to be positioned and mounted relative to the wheel on which it acts, for example, to be fixedly mounted on the tread cleaner bearing portion of the bogie. Therefore, the tread cleaner is generally provided with a corresponding mounting base using to fixedly mount the tread cleaner on the corresponding tread cleaner bearing portion. However, in some cases, the corresponding mounting and matching surface (also used as the bearing surface) on the tread cleaner bearing portion is not horizontally arranged, for example, the bearing surface has a relatively large, included angle with the horizontal direction, that is, the bearing surface is obliquely arranged, so the mounting angle has a certain inclination angle. In this case, in the process of fixedly mounting the tread cleaner on the tread cleaner bearing portion, it is necessary to first rely on manual external force to position the relatively heavy tread cleaner with respect to the tread cleaner bearing portion and avoid the tread cleaner from sliding down relative to the bearing surface due to its own force of gravity. Therefore, during the mounting process, the mounting and positioning of the tread cleaner with respect to the tread cleaner bearing portion is difficult.

The Chinese patent with application number CN201621341200.4 discloses a general-purpose base tread cleaning device. The body of the device is provided with a piston rod, and the overhanging end of the piston rod is provided with an abrasive block through an abrasive block carrier; the base has a hinge pin hole, a positioning pin hole, and an arc groove with jagged edges; the bottom of the body has a hinge hole, a pin axle hole, and a curved groove; the hinge pin hole, hinge hole, and positioning pin hole can optionally be inserted with centering pins; the respective jags of the jagged edge have a 2θ indexing angle with respect to the hinge pin hole respectively, and a composite hinge pin is provided in the arc groove with jagged edges; the width of the curved groove matches the diameter of the centering pin, and the center line is the curve determined by an equation set, which can meet the mounting requirements where the mounting accuracy for various inclination angles is θ.

The Chinese patent with publication number of CN206383970U discloses a tread cleaning device, which adopts a split-type mounting base structure, wherein some of the embodiments also need to adopt the means of inclination angle mounting.

SUMMARY OF THE INVENTION

In view of the above, the present application provides an end cover assembly, a cylinder, a tread cleaner and a railway vehicle, thereby effectively solving or at least alleviating one or more of the above problems and problems in other aspects existing in the prior art.

According to one aspect of the present application, an end cover assembly for sealing an air inlet end of a cylinder of a tread cleaner is provided, which comprises: a cylinder cover having an inner side end face disposed towards the cylinder and an outer side end face disposed away from the cylinder; a first external thread column body extending and protruding is provided on an inner side end face of the cylinder cover, and is mounted matching the cylinder; and a second external thread column body extending and protruding is provided on an outer side end face of the cylinder cover; the cylinder cover is provided with a through mounting hole extending through the first external thread column body and the second external thread column body and is used for arranging an air core and an elastic pull rod; and a gland having an inner side end face disposed towards the cylinder cover and an outer side end face disposed away from the cylinder cover, wherein, a threaded hole matching the second external thread column body is provided on the inner side end face of the gland, and a throttle air vent hole is provided between the threaded hole and the outer side end face of the gland; wherein, a first mounting groove is further provided between the inner side end face and the threaded hole of the gland; in an assembled state, the inner side end face of the gland abuts against the outer side end face of the cylinder cover, and sealing is provided via sealing rings disposed in the first mounting groove.

According to the end cover assembly of some embodiments of the present application, a first cylinder extending and protruding is provided on an inner side end face of the first external thread column body disposed towards the cylinder, diameter of the first cylinder being smaller than diameter of the first external thread column body, wherein, the first external thread column body is matched with a supporting cylinder liner of the cylinder, and the first cylinder is matched with a cylinder barrel of the cylinder.

According to the end cover assembly of some embodiments of the present application, a second mounting groove is provided between the first external thread column body and the inner side end face of the cylinder cover. In an assembled state, sealing for the supporting cylinder liner of the cylinder and the first external thread column body is provided via sealing rings disposed in the second mounting groove.

According to the end cover assembly of some embodiments of the present application, a third mounting groove is provided on a side wall of the first column body. In an assembled state, sealing for the cylinder barrel of the cylinder and the first column body is provided by sealing rings disposed in the third mounting groove.

According to the end cover assembly of some embodiments of the present application, a limiting step and a limiting groove for mounting an air core are provided on the mounting hole in the second external thread column body.

According to another aspect of the present application, a cylinder is further provided, which comprises: a supporting cylinder liner, a cylinder barrel, an air core, an elastic pull rod and the aforementioned end cover assembly; wherein, the end cover assembly is assembled to an end of the supporting cylinder liner through the first external thread column body on the cylinder cover; the air core is inserted in the mounting hole of the cylinder cover; and one end of the elastic pull rod is disposed in the mounting hole close to the air core.

According to the cylinder of some embodiments of the present application, the air core is configured as a stepped air core, a limiting step and a limiting groove are provided on the mounting hole in the second external thread column body, and a limiting stopper having a through hole is further provided; wherein, the stepped end of the stepped air core is limited by the limiting step, and the other end of the stepped air core is limited by the limiting stopper snapped in the limiting groove.

According to the cylinder of some embodiments of the present application, the through hole of the limiting stopper and the through hole of the stepped air core are arranged in a staggered manner.

According to still another aspect of the present application, a tread cleaner is further provided, which comprises: an abrasive block; a brake head for mounting the abrasive block; and the aforementioned cylinder for driving the abrasive block to move towards the wheel tread.

The tread cleaner according to some embodiments of the present application, further comprises a gap adjustment device provided on the cylinder body of the cylinder, wherein, the gap adjustment device comprises: a tooth-shaped member provided with a first tooth surface meshing portion, and configured to be capable of axial relative movement relative to a piston rod of the cylinder; a latch mechanism comprising a latch rod portion and a latch head portion, wherein, the latch head portion is provided with a second tooth surface meshing portion to be meshed with the first tooth surface meshing portion; a reset elastic member that acts on the latch mechanism, enabling the second tooth surface meshing portion to be meshed with the first tooth surface meshing portion; wherein, the tooth-shaped member is provided with a first stop position and a second stop position relative to the piston rod, and at the first stop position or the second stop position, the tooth-shaped member moves towards the wheel tread together with the piston rod, or stops the piston rod from moving away from the wheel tread.

The tread cleaner according to some embodiments of the present application, wherein, a guide groove is axially provided on the piston rod, and wherein, the first stop position and the second stop position are respectively formed at two axial ends of the guide groove, and the tooth-shaped member moves freely in the guide groove in the axial direction.

The tread cleaner according to some embodiments of the present application, wherein, the dimensional difference between an axial length of the guide groove and an axial length of the tooth-shaped member is within a predetermined range.

The tread cleaner according to some embodiments of the present application, wherein, the second tooth surface meshing portion of the latch head portion comprises a plurality of tooth portions that mesh with the first tooth surface meshing portion of the tooth-shaped member in a form-fitting manner.

The tread cleaner according to some embodiments of the present application, wherein, the tooth-shaped member moves towards the wheel tread relative to the latch head portion unidirectionally in the axial direction.

The tread cleaner according to some embodiments of the present application, wherein, the angle of a right meshing surface of the first tooth surface meshing portion relative to a plane of the tooth-shaped member is 40-50 degrees.

The tread cleaner according to some embodiments of the present application, wherein, the angle of a left meshing surface of the first tooth surface meshing portion relative to a plane of the tooth-shaped member is 70-80 degrees.

The tread cleaner according to some embodiments of the present application, wherein, the latch mechanism further comprises a protruding shoulder axially connecting the latch head portion and the latch rod.

The tread cleaner according to some embodiments of the present application, wherein, the reset elastic member is sleeved on the latch rod and sits on the protruding shoulder.

The tread cleaner according to some embodiments of the present application, wherein, the gap adjustment device further comprises a guide element that guides the latch head portion to move under the action of the tooth-shaped member or the reset elastic member.

The tread cleaner according to some embodiments of the present application, wherein, the guide element is configured as a sleeve with a T-shaped cross-section that is sleeved on the latch head portion by abutting against the protruding shoulder.

The tread cleaner according to some embodiments of the present application, wherein, the latch mechanism further comprises a latch cover that surrounds the reset elastic member and secures an end of the reset elastic member that is away from the protruding shoulder.

The tread cleaner according to some embodiments of the present application, wherein, the tooth pitch between the first tooth surface meshing portion and the second tooth surface meshing portion is designed according to gap adjustment accuracy.

The tread cleaner according to some embodiments of the present application, further comprises: a gap adjustment device provided on the cylinder body of the cylinder; the tread cleaner further comprises: a tooth-formed component fixedly disposed on the piston rod of the cylinder; and the gap adjustment device comprises: a movable latch, with a latch head thereof capable of meshing with the tooth-formed component; a latch base limited in a gap adjustment device mounting hole of the cylinder body; and an elastic member for applying a down force to the latch base towards the tooth-formed component; wherein, an upper end of the movable latch is sleeved on a guide groove of the latch base provided along the movement direction of the piston rod, and is capable of following the tooth-formed component meshed with it to move back and forth along the guide groove in the gap adjustment device mounting hole.

The tread cleaner according to some embodiments of the present application, wherein, the tooth-formed component is detachably fixedly mounted on the piston rod through a tooth-formed component fixing part or is provided integrally with the piston rod.

The tread cleaner according to some embodiments of the present application, wherein, a groove facing towards the movable latch is provided on the piston rod, and the tooth-formed component is fixed in the groove.

The tread cleaner according to some embodiments of the present application, wherein, the latch base is configured as a component that is non-rotating relative to the gap adjustment device mounting hole.

The tread cleaner according to some embodiments of the present application, wherein, the latch base is overall in the shape of a double U and has limiting side faces that are substantially parallel to the movement direction of the piston rod.

The tread cleaner according to some embodiments of the present application, wherein, the guide groove is a T-shaped groove, and the upper end of the movable latch is correspondingly configured as a T-shaped joint.

The tread cleaner according to some embodiments of the present application, wherein, a front side face of the rod portion and a rear side face of the rod portion of the movable latch are configured so as to be respectively capable of forming surface contact with part of the abutted inner side wall of the gap adjustment device mounting hole.

The tread cleaner according to some embodiments of the present application, wherein, during the forward movement of the piston rod, after the movable latch moves forward to abut against the inner side wall of one side of the gap adjustment device mounting hole, the movable latch overcomes the down force under the applied force transmitted by the tooth surface of the tooth-formed component and slides between the tooth slots of the tooth-formed component; during the backward movement of the piston rod, after the movable latch moves backward to abut against the inner side wall of the other side of the gap adjustment device mounting hole, the movable latch is locked in the corresponding tooth slot of the tooth-formed component so as to prevent the piston rod from continuing to move backward.

The tread cleaner according to some embodiments of the present application, wherein, the included angle of a left meshing surface of the latch head of the movable latch relative to the vertical direction is smaller than the included angle of a right tooth surface of the tooth of the tooth-formed component relative to the vertical direction; the included angle of a right meshing surface of the latch head of the movable latch relative to the vertical direction is greater than the included angle of a left tooth surface of the tooth of the tooth-formed component relative to the vertical direction.

The tread cleaner according to some embodiments of the present application, wherein, the included angle of a left meshing surface of the latch head of the movable latch relative to the vertical direction is equal to about 15°, and the included angle of the right tooth surface of the tooth of the tooth-formed component relative to the vertical direction is equal to about 45°; the included angle of a right meshing surface of the latch head of the movable latch relative to the vertical direction is equal to about 45°, and the included angle of a left tooth surface of the tooth of the tooth-formed component relative to the vertical direction is equal to about 25°.

The tread cleaner according to some embodiments of the present application, wherein, the tread cleaner further comprises: a manual relief member for disengage the movable latch from the tooth-formed component by overcoming the down force by an external force; and a fixing bolt for mounting the inner end of the manual relief member between an upper surface of the latch base and the elastic member.

The tread cleaner according to some embodiments of the present application, wherein, the inner end and the lower end of the fixing bolt are threadedly fastened with the positioning and mounting hole of the latch base; the lower end of the elastic member abuts against the upper surface of the inner end of the manual relief member.

The tread cleaner according to some embodiments of the present application, wherein, the outer end of the manual relief member protrudes from a side wall of the gap adjustment device mounting hole.

The tread cleaner according to some embodiments of the present application, wherein, the gap adjustment device further comprises: a latch cover fixedly mounted on the upper end of the gap adjustment device mounting hole and covering the gap adjustment device mounting hole; wherein, the upper end of the elastic member abuts against the latch cover.

The tread cleaner according to some embodiments of the present application, further comprises: a mounting base with a mounting and positioning function used to realize fixed mounting of the tread cleaner; wherein, a first positioning and matching portion is provided on a bottom mounting surface of the mounting base, wherein, the first positioning and matching portion is used for positioning the mounting base with respect to the tread cleaner bearing portion during the process of mounting the tread cleaner on the tread cleaner bearing portion.

The tread cleaner according to some embodiments of the present application, wherein, in the process of mounting the tread cleaner on the tread cleaner bearing portion, the first positioning and matching portion is matched with a second positioning and matching portion on a mounting and matching surface of the tread cleaner bearing portion, so as to prevent the tread cleaner from sliding down relative to the inclined mounting and matching surface.

The tread cleaner according to some embodiments of the present application, wherein, the first positioning and matching portion comprises a first positioning and matching convex portion, and the second positioning and matching portion comprises a first positioning and matching concave portion provided corresponding to the first positioning and matching convex portion; wherein, the first positioning and matching convex portion at least partially protrudes into the first positioning and matching concave portion.

The tread cleaner according to some embodiments of the present application, wherein, the first positioning and matching convex portion is provided protruding downward from the bottom mounting surface of the mounting base, and the first positioning and matching concave portion is provided recessing downward from the mounting and matching surface of the tread cleaner bearing portion.

The tread cleaner according to some embodiments of the present application, wherein, the first positioning and matching convex portion is a wedge-shaped block, and the first positioning and matching concave portion is a wedge-shaped groove; wherein, the groove opening of the wedge-shaped groove gradually narrows down from high to low along the inclined mounting and matching surface, and when the wedge-shaped block slides obliquely downward in the wedge-shaped groove to a predetermined position, two wedge-shaped side faces of the wedge-shaped block respectively abut against two wedge-shaped side edges of the wedge-shaped groove.

The tread cleaner according to some embodiments of the present application, wherein, the wedge-shaped side edges of the wedge-shaped groove are inclined inward in a bottom-to-top direction, so that the upper opening of the wedge-shaped groove forms a closing-in structure relative to the bottom surface thereof; and correspondingly, the wedge-shaped side faces of the wedge-shaped block that abut against the wedge-shaped side edges are also inclined inward in a bottom-to-top direction.

The tread cleaner according to some embodiments of the present application, wherein, a convex height of the first positioning and matching convex portion is smaller than or equal to a concave depth of the first positioning and matching concave portion.

The tread cleaner according to some embodiments of the present application, wherein, the first positioning and matching convex portion may be in a rectangular column shape or cylindrical shape, and correspondingly, the first positioning and matching concave portion may be a rectangular hole or a circular hole.

The tread cleaner according to some embodiments of the present application, wherein, the first positioning and matching portion comprises a second positioning and matching concave portion, and the second positioning and matching portion comprises a second positioning and matching convex portion provided corresponding to the second positioning and matching concave portion; wherein, the second positioning and matching convex portion at least partially protrudes into the second positioning and matching concave portion.

The tread cleaner according to some embodiments of the present application, wherein, the second positioning and matching convex portion is arranged protruding upward from the mounting and matching surface of the tread cleaner bearing portion, and the second positioning and matching concave portion is arranged recessing upward from the bottom mounting surface of the mounting base.

The tread cleaner according to some embodiments of the present application, wherein, the second positioning and matching convex portion is a wedge-shaped block, and the second positioning and matching concave portion is a wedge-shaped groove; wherein, the groove opening of the wedge-shaped groove gradually narrows down from low to high along the obliquely mounted mounting and matching surface, and when the wedge-shaped groove moves obliquely downward relative to the wedge-shaped block to a predetermined position, two wedge-shaped side faces of the wedge-shaped block respectively abut against two wedge-shaped side edges of the wedge-shaped groove.

The tread cleaner according to some embodiments of the present application, wherein, the wedge-shaped side edges of the wedge-shaped groove are inclined inward in a top-to-bottom direction, so that the lower opening of the wedge-shaped groove forms a closing-in structure relative to the upper bottom surface thereof; and correspondingly, the wedge-shaped side faces of the wedge-shaped block that abut against the wedge-shaped side edges are also inclined inward in a top-to-bottom direction.

The tread cleaner according to some embodiments of the present application, wherein, a convex height of the second positioning and matching convex portion is smaller than or equal to a concave depth of the second positioning and matching concave portion.

The tread cleaner according to some embodiments of the present application, wherein, the second positioning and matching convex portion is in a rectangular column or cylindrical shape, and correspondingly, the second positioning and matching concave portion is a rectangular hole or a circular hole.

The tread cleaner according to some embodiments of the present application, wherein, a plurality of bolt fastening holes are provided on a base plate of the mounting base.

The tread cleaner according to some embodiments of the present application, wherein, the mounting base is connected with the cylinder body of the cylinder.

According to yet another aspect of the present application, a railway vehicle is further provided, which comprises: the aforementioned end cover assembly; or the aforementioned cylinder; or the aforementioned tread cleaner.

According to another aspect of the present application, a railway vehicle is provided, which comprises any of the aforementioned tread cleaners; wherein, the tread cleaner is positioned and mounted relative to a wheel tread of a wheel, and in the process of mounting the tread cleaner on a tread cleaner bearing portion, the first positioning and matching portion is matched with a second positioning and matching portion on the mounting and matching surface of the tread cleaner bearing portion, so as to prevent the tread cleaner from sliding down relative to the oblique mounting and matching surface.

The principles, characteristics, features, advantages, etc. of the various technical solutions according to the present application will be clearly understood from the following detailed description in conjunction with the accompanying drawings. For example, compared with the prior art, the technical solutions of the present application, through split-type structures in conjunction with sealing rings, on the one hand provide a simple assembly process, thereby the assembly efficiency is improved and the assembly cost is reduced, and on the other hand provide a good sealing performance, so that the output pressure of the device is stable, which facilitates the product to perform its functions; in addition, the arrangement positions of the sealing rings are not in conflict with and the threaded connection portions between the split-type mechanisms, taking into account the reliability of mounting and sealing.

In addition, the tread cleaner with the gap adjustment device of the embodiments of the present application also has one or more of the following effects:

First, by setting the motion relationship of the tooth-shaped member relative to the piston rod, the function of gap adjustment is realized, and the reset distance of the piston rod is controlled, so that the gap between the abrasive block and the wheel is kept within a set range.

Second, the meshing of the plurality of meshing portions improves the reliability and adjustment accuracy of the gap adjustment device.

Third, the tooth-formed component (such as gear rack) is fixed on the piston rod and does not need to move forward and backward relative to the piston rod. Even if the driving torque of the cylinder is large and the working environment is poor, the tooth-formed component will basically not have problems such as bending and jamming. This improves the working reliability of the tread cleaner and reduces the maintenance work of the tread cleaner.

Fourth, the movable latch can slide back and forth in the guide groove of the latch base, which can not only automatically realize the function of gap adjustment, but also prevent the latch from breaking, bending, and falling off.

Fifth, the gap adjustment device of the tread cleaner according to the embodiments of the present application has a simple structure, is easy to disassemble, and is easy to maintain.

Sixth, it is convenient to arrange a manual relief member, so that the release operation becomes convenient and easy, which saves time and effort and is easy to operate.

In addition, the tread cleaner with the mounting base and the railway vehicle according to the embodiments of the present application may also have at least one of the following effects:

First, the problem that the obliquely mounted tread cleaner has no mounting and positioning function before it is bolted is solved, which avoids the risk of slipping, and saves the time and manpower of manually positioning the tread cleaner through holding by hand, so that the mounting is easier, time-saving and labor-saving, and it also facilitates the subsequent operation of the fastening bolts.

Second, during the use of the tread cleaner after mounting, the mounting and positioning function provided by the mounting base can continue to play an effective role, for example, when used in conjunction with the fastening bolts, it can share the bearing force of the fastening bolts and improve the safety factor of the fastening bolts; in addition, when the bolts are broken due to abnormal conditions, the mounting and positioning function can prevent the tread cleaner from falling off when a falling prevention function is further provided, thereby ensuring the safe operation of the railway vehicle.

BRIEF DESCRIPTION OF THE DRAWINGS

The above and other objectives and advantages of the present application will be completer and more apparent from the following detailed description in conjunction with the accompanying drawings, wherein, the same or similar elements are denoted by the same reference numerals.

DETAILED DESCRIPTION OF THE EMBODIMENT(S) OF THE INVENTION

The present application is described more comprehensively below with reference to the accompanying drawings, in which illustrative embodiments of the application are illustrated. However, the present application may be implemented in different forms and should not be construed as being limited only to the embodiments provided herein. Each of the above embodiments is provided for the purpose of making the disclosure of the text comprehensive and complete, so as to make the understanding of the protection scope of the present application more comprehensive and accurate.

Terms such as "comprise" and "include" indicate that in addition to the components that are directly and explicitly stated in the specification and claims, the technical solutions of the present application do not exclude the situation that other components that are not directly or explicitly stated are also included.

It should be noted that when a component is said to be "connected" or "coupled" to another component, it can be directly connected or coupled to another component, or there may be intermediate components. In addition, the expressions "first", "second", etc. in the present application are only for distinguishing different components, and do not constitute any limitation on the structure or function and other aspects of the components.

In addition, for any single technical feature described or implied in the embodiments mentioned herein or any single technical feature shown or implied in individual drawings, the present application still allows for any combination or deletion of these technical features (or equivalents thereof) without any technical obstacle, thereby obtaining more other embodiments of the present application that may not be directly mentioned herein.

Figure 1:
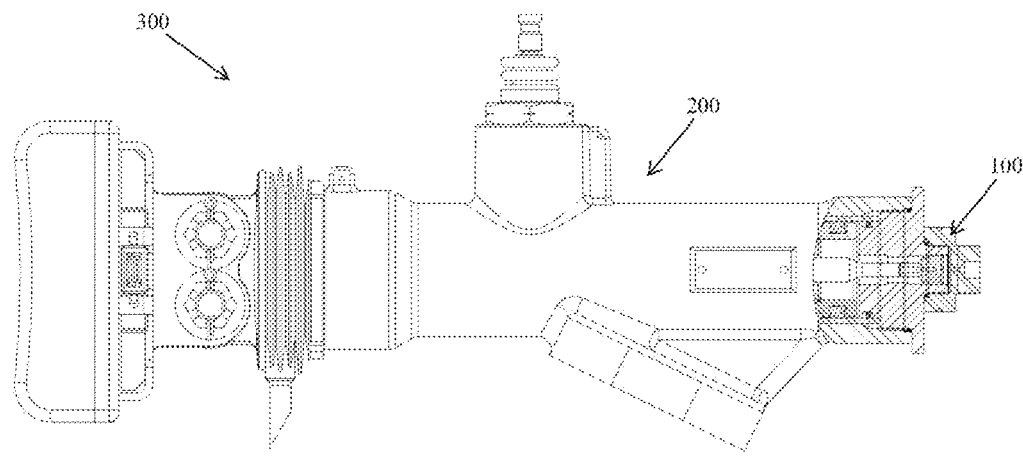
FIG. 1 is a schematic diagram of an embodiment of an assembled tread cleaner of the present application, in which a section view of an end cover assembly portion is shown.
Figure 2:
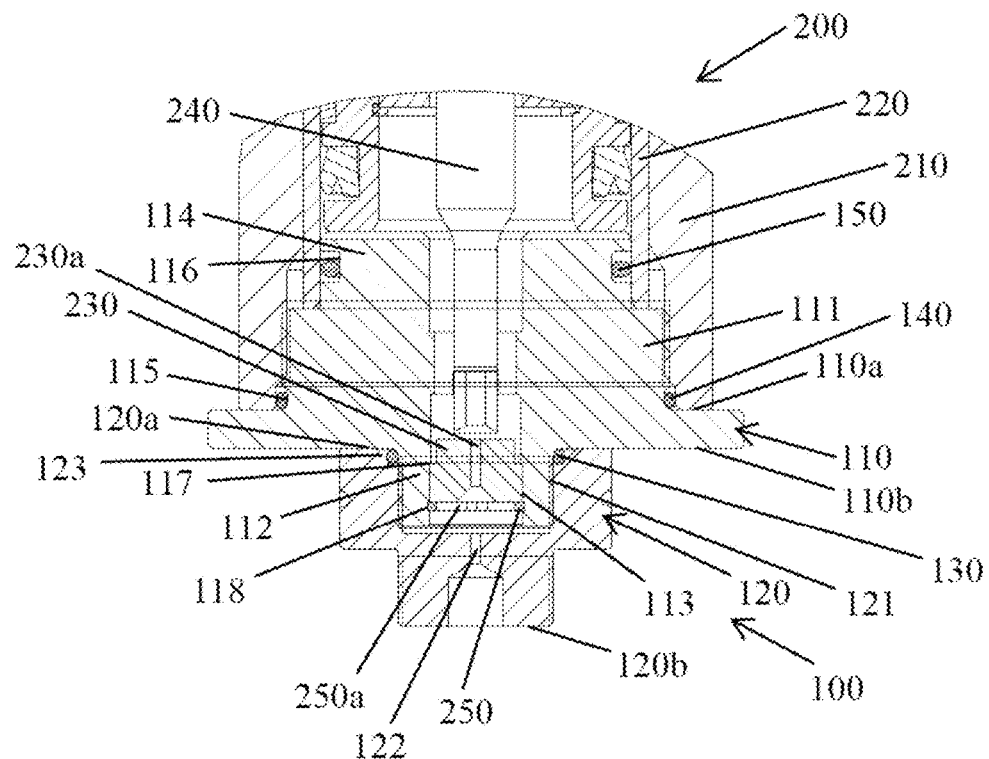
FIG. 2 is a schematic cross-sectional view of an embodiment of an end cover assembly in a tread cleaner of the present application.

FIG. 1 only schematically shows the general structural configuration of an embodiment of an assembled tread cleaner according to the present application, and FIG. 2 shows in detail the structural configuration of an end cover assembly therein. The technical solutions of the present application will be described in detail below with reference to the above drawings.

As shown in FIGS. 1 and 2, an end cover assembly therein has been assembled on a cylinder 200 of a tread cleaner 300 and sealing of an air inlet end of the cylinder 200 (shown as a cylinder) of the tread cleaner 300 has been completed. An end cover assembly 100 will first be described as follows. The end cover assembly 100 comprises a cylinder cover 110 and a gland 120 in a split-type structure. Wherein, the cylinder cover has an inner side end face 110a disposed towards the cylinder and an outer side end face 110b disposed away from the cylinder. Wherein, an extending and protruding first external thread column body 111 is provided on the inner side end face 110a of the cylinder cover 110 for matching and mounting with the cylinder. In addition, an extending and protruding second external thread column body 112 is provided on the outer side end face of the cylinder cover 110 for matching with the gland 120. The cylinder cover 110 further comprises a through mounting hole 113, and the through mounting hole 113 extends through the first external thread column body 111 and the second external thread column body 112 for arranging an air core 230 and an elastic pull rod 240. And the gland 120 has an inner side end face 120a disposed towards the cylinder cover 110 and an outer side end face 120b disposed away from the cylinder cover 110. A threaded hole 121 matched with the aforementioned second external thread column body 112 is provided on the inner side end face 120a of the gland 120, and a throttle air vent hole 122 is provided between the threaded hole 121 and the outer side end face 120b of the gland 120 for air flow regulation. During the assembling process, the cylinder cover 110 may first be assembled on the end of the cylinder, and then the gland 120 may be assembled on the cylinder cover 110. In this process, in order to achieve the sealing between the two, a first mounting groove 123 is further provided between the inner side end face and the threaded hole 121 of the gland 120. At this time, when the inner side end face of the gland 120 is screwed to abut against the outer side end face of the cylinder cover 110, sealing may be provided via a sealing ring 130 arranged in the first mounting groove 123.

Under such an arrangement, the present application, through a split-type structure in conjunction with sealing rings, on the one hand provides a simple assembly process, thereby the assembly efficiency is improved, and the assembly cost is reduced; and on the other hand, provides a better sealing performance compared with end face seal, so that the output pressure of the device is stable, which facilitates the product to perform its functions. In addition, the installation positions of the sealing rings avoid the threaded portions used to realize the connection between the split-type mechanisms, so that the two will not conflict, taking into account the reliability of mounting and sealing.

On the basis of the aforementioned embodiments, several modifications can also be made to the respective components of the end cover assembly or the relationships of the connection positions thereof, so as to obtain other technical effects, which will be exemplified below.

For example, an extending and protruding first column body 114 is further provided on the inner side end face of the first external thread column body 111 disposed towards the cylinder, and the diameter of the first column body 114 is smaller than the diameter of the first external thread column body 111. At this time, the first external thread column body 111 and the first column body 114 are assembled with different components, respectively. For example, the first external thread column body 111 is matched with a supporting cylinder liner 210 of the cylinder, and the first column body 114 is matched with a cylinder barrel 220 of the cylinder. Such an arrangement is mainly provided to match the structure of the cylinder. Considering the weight of the whole equipment and the requirements for the driving force, a relatively thick and high-strength supporting cylinder liner 210 is required to realize the supporting and providing the structure. At the same time, considering the smoothness of the gas flow in the cylinder, a cylinder barrel 220 with an inner wall of higher machining accuracy should further be provided. Therefore, the design of the aforementioned driving device takes into account both cost and function, and the corresponding end cover assembly is also designed to match the cylinder.

For another example, when the end cover assembly has the aforementioned segments to connect with different components, it is necessary to ensure the sealing performance of the connection of each segment. At this time, the end cover assembly can also be provided with the following designs. For example, a second mounting groove 115 is provided between the first external thread column body 111 and the inner side end face of the cylinder cover 110; at this time, in an assembled state, the supporting cylinder liner 210 of the cylinder and the first external thread column body 111 are sealed by a sealing ring 140 disposed in the second mounting groove 115. Alternatively, a third mounting groove 116 is provided on the side wall of the first column body 114; at this time, in an assembled state, the cylinder barrel 220 of the cylinder and the first column body 114 are sealed by a sealing ring 150 disposed in the third mounting groove 116. On one hand, such sealing rings provide a better sealing performance compared with end face seal, and on the other hand, arrangements have also been made for the special mounting grooves of the sealing rings to avoid the inherent threaded portions of the product, so that the two will not conflict, taking into account the reliability of mounting and sealing.

For still another example, in order to improve the reliability of the assembling the air core, a limiting step 117 and a limiting groove 118 for mounting the air core 230 may be provided on a mounting hole 113 in the second external thread column body 112, so as to limit the air core 230 on both ends in the axial direction, thereby ensuring its stable and reliable mounting.

With continued reference to FIGS. 1 and 2, an embodiment of a cylinder 200 is further shown. The cylinder 200 comprises: a supporting cylinder liner 210, a cylinder barrel 220, an air core 230, an elastic pull rod 240, and the end cover assembly 100 in any of the aforementioned embodiments or combinations thereof. At this time, the end cover assembly 100 may first be assembled to an end of the supporting cylinder liner 210 through the first external thread column body 111 on the cylinder cover 110. And then the elastic pull rod 240 may be adjusted at the other end of the cylinder, so that it and the cylinder cover 110 form an assembly relationship capable of relative movement. And the air core 230 is inserted into the mounting hole 113 of the cylinder cover 110, so that one end of the elastic pull rod 240 is close to the air core 230 arranged in the mounting hole 113. Finally, the gland 120 is assembled on the cylinder cover to complete the assembly and sealing. Wherein, as a common structural form of a pull rod in a cylinder, a radially protruding protrusion may be provided on the pull rod, and a corresponding chute is provided on the cylinder cover 110. By rotating the pull rod, the protrusion thereof is embedded in the chute on the cylinder cover 110, so as to realize the assembly between the two. And the pull rod can also realize reciprocating movement along the chute under the action of elastic elements such as springs.

Under such an arrangement, the present application, through a split-type structure in conjunction with sealing rings, on the one hand provides a simple assembly process, thereby the assembly efficiency is improved and the assembly cost is reduced, and on the other hand, provides a better sealing performance compared with end face seal, so that the output pressure of the device is stable, which facilitates the product to perform its functions. In addition, the arrangement positions of the sealing rings avoid the threaded portions used to realize the connections between the split-type mechanisms, so that the two will not conflict, taking into account the reliability of mounting and sealing. In addition, since one end of the elastic pull rod 240 in the present application is arranged in the mounting hole 113 close to the air core 230, if the protrusion of the pull rod fails to be snapped into the chute on the cylinder cover 110 during the assembly process, the pull rod will extend forward in the downward direction shown in the figure, so that the air core cannot be mounted in place. Therefore, such an arrangement also enables the misassembly of the elastic pull rod to be identified and corrected, thereby effectively eliminating the problem of misassembly of the elastic guide rod.

On the basis of the aforementioned embodiments, several modifications can also be made to the respective components of the cylinder or the relationships of the connection positions thereof, so as to obtain other technical effects, which will be exemplified below.

For example, in order to provide better positioning for the air core 230, the air core 230 may be configured as a stepped air core 230. Accordingly, a limiting step 117 and a limiting groove 118 are provided on the mounting hole 113 in the second external thread column body 112 of the cylinder cover 110 of the end cover assembly 100, and the driving device may further comprise a limiting stopper 250 having a through hole 250a to assist in the positioning of the air core 230. Specifically, when the stepped air core 230 is assembled into the cylinder cover 110, the stepped end of the stepped air core 230 will first be limited by the limiting step 117 in the mounting hole 113. At this time, it can be seen that the stepped end of the stepped air core 230 has been mounted in place. Then, the elastic limiting stopper 250 is pressed and snapped into the limiting groove 118 in the mounting hole 113, so as to limit the other end of the stepped air core 230. Such an arrangement provides a simple and effective way of fixing the air core, so that when the air core and the elastic pull rod jointly regulate the inlet air flow and the outlet air flow in the cylinder, it is more stable and reliable.

For another example, in order to provide a further air flow regulation effect, the through hole 250a on the limiting stopper 250 and the through hole 230a on the stepped air core 230 can also be arranged in a staggered manner.

In addition, as shown in FIGS. 1 and 2, the present application further provides a tread cleaner 300, on which any embodiments or combinations of the embodiments of the aforementioned end cover assembly 100 can be arranged, or any embodiments or combinations of the embodiments of the aforementioned cylinder 200 can be arranged, according to application requirements. Thereby, it also has the technical effects brought about by the aforementioned technical solutions.

Figure 3:
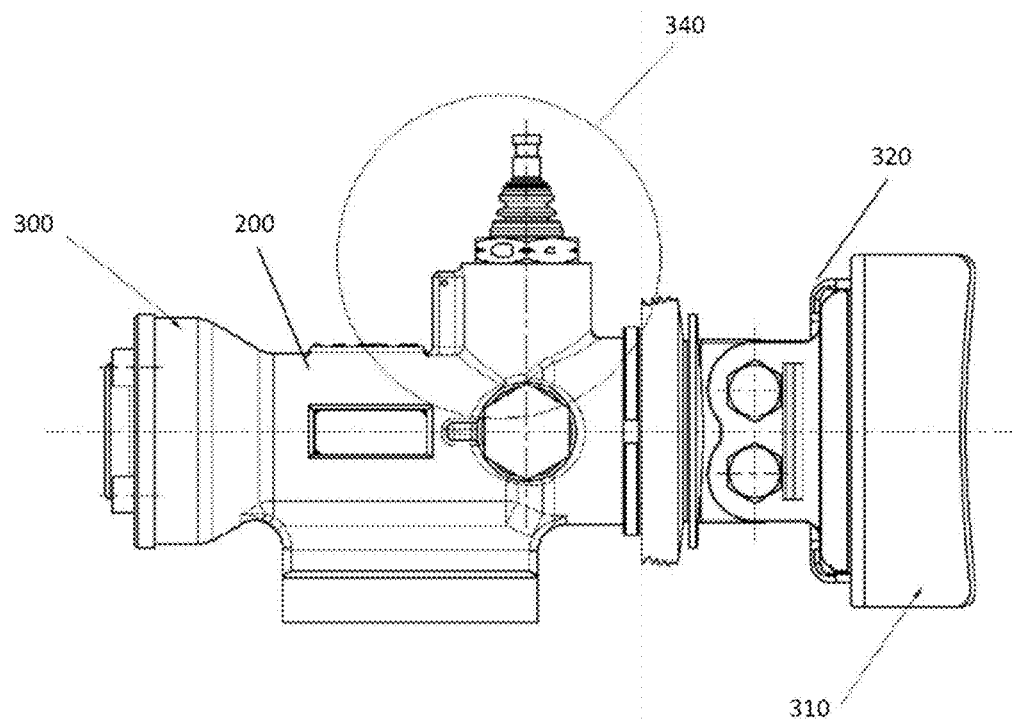
FIG. 3 is a schematic diagram of an embodiment of a tread cleaner of the present application.

With continued reference to FIG. 3, it can be seen that a gap adjustment device 340 may further be provided in the tread cleaner 300 according to the present application. The tread cleaner 300 under such an arrangement may comprise: an abrasive block 310, a brake head 320, any of the aforementioned embodiments or combinations thereof of the cylinder 200, and a gap adjustment device 340 disposed on the cylinder barrel 220 of cylinder 200. Here, the tread cleaner 300 can, for example, by using a pressure gas source, transport to the cylinder 200, and then the piston rod 260 in the cylinder 200 is driven to push the brake head 320 together with the abrasive block 310 to move towards the wheel tread, so as to clean the wheel tread. Here, the gap adjustment device 340 can, by fixing the piston rod 260, adjust the relative gap between the abrasive block 310 and the wheel tread when the wheel tread is being cleaned, thereby preventing the gap between the abrasive block 310 and the wheel tread from getting bigger and bigger as the abrasive block 310 continuously wears out with use.

Figure 4:
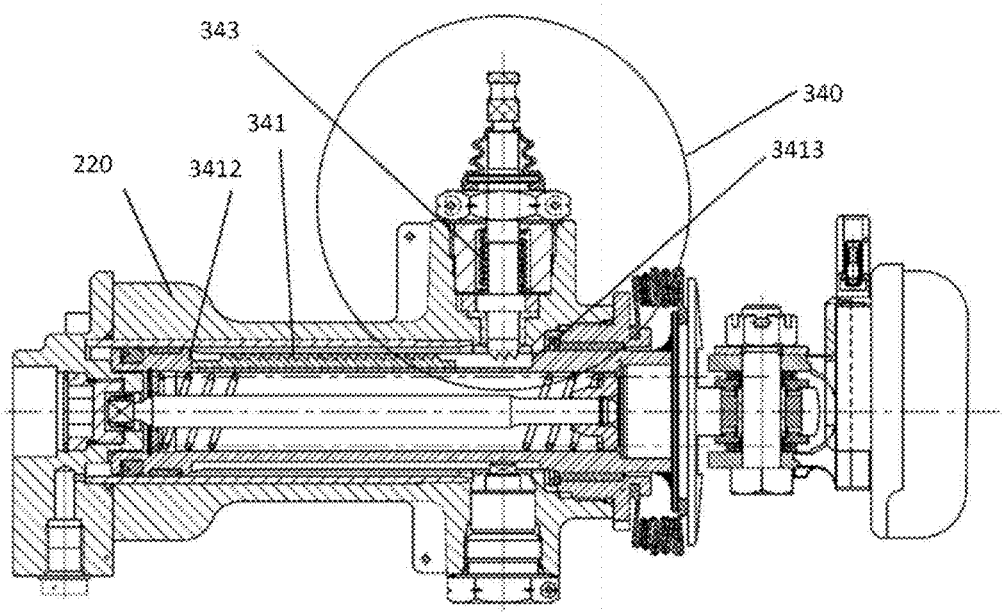
FIG. 4 is a schematic cross-sectional view of an embodiment of a gap adjustment device of the present application.
Figure 5:
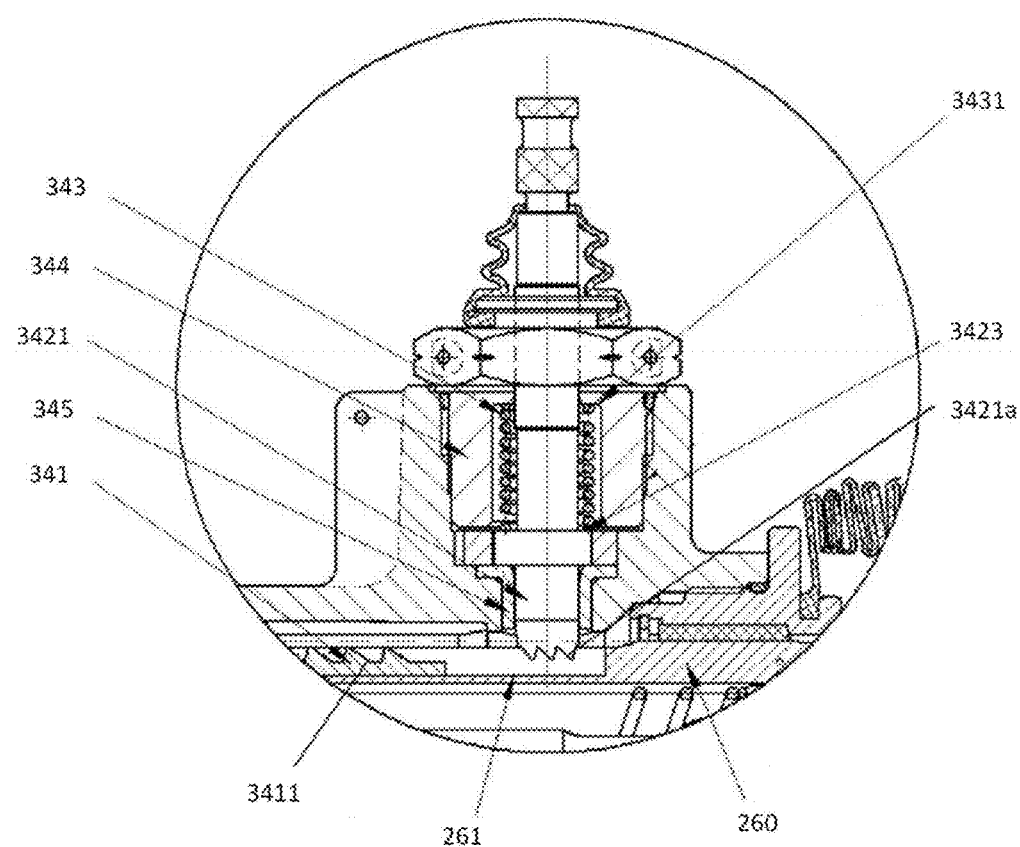
FIG. 5 is a partially enlarged schematic view of a cross section of an embodiment of a gap adjustment device of the present application.

With continued reference to FIG. 4 and FIG. 5, it can be seen that the gap adjustment device disclosed in the present application may exemplarily comprise a tooth-shaped member 341, a latch mechanism 342 and a reset elastic member 343, wherein, the tooth-shaped member 341 can be configured, for example, as a gear rack element provided with a first tooth surface meshing portion 3411, which jointly works with the latch mechanism 342 and the reset elastic member 343 to adjust the relative position of the piston rod 260. Specifically, the latch mechanism 342 has a latch head portion 3421 and a latch rod portion 3422, wherein, the latch head portion 3421 is provided with a second tooth surface meshing portion 3421a capable of meshing with the first tooth surface meshing portion 3411 of the tooth-shaped member 341. In addition, the reset elastic member 343 acts on the latch mechanism 342, so that the second tooth surface meshing portion 3421a is kept meshed with the first tooth surface meshing portion 3411 under the action of elastic force.

In the gap adjustment device disclosed in the present application, in order to adjust the relative position of the piston rod 260, or in other words, in order to adjust the gap of the abrasive block 310 relative to the wheel tread, and at the same time also to realize that the piston rod 260 can easily and conveniently move back and forth when there is no cylinder drive or when the pressure gas source does not transport gas, so that the abrasive block 310 can maintain a required gap from the wheel tread, the tooth-shaped member 341 may exemplarily have two stop positions relative to the piston rod 260, namely a first stop position 3412 and a second stop position 3413. In this case, for example, when the tooth-shaped member 341 is at the first stop position 3412 or the second stop position 3413, it can move together with the piston rod 260 or prevent the piston rod 260 from moving; while when the tooth-shaped member 341 is at a position between the first stop position 3412 and the second stop positions 3413, it can move freely in the axial direction relative to the piston rod 260.

Specifically, here, the first stop position 3412 can, for example, be arranged as a position away from the wheel tread, and the second stop position 3413 can be arranged as a position close to the wheel tread. Of course, an opposite arrangement is also feasible. When the tooth-shaped member 341 is at the first stop position 3412, the piston rod 260 drives the tooth-shaped member 341 to move towards the wheel tread together, and at the same time the first tooth surface meshing part 3411 thereof slides over the second tooth surface meshing part 3421a until the piston rod 260 stops moving towards the wheel tread. And, at this time, the second tooth surface meshing portion 3421a recovers and maintains meshed with the first tooth surface meshing portion 3411 under the elastic force of the reset elastic member 343. As such, the gap of the abrasive block relative to the wheel tread is adjusted. Then, when the piston rod 260 moves back away from the wheel tread, the tooth-shaped member 341 remains stationary relative to the latch head portion 3421, and only the piston rod 260 moves axially relative to the tooth-shaped member 341 until the tooth-shaped member 341 is positioned at the second stop position 3413 relative to the piston rod 260. In the second stop position 3413, the tooth-shaped member 341 prevents the piston rod 260 from continuing to move away from the wheel tread, so that the gap between the piston rod 260 and the wheel tread is kept within a certain range.

In some embodiments of the present application, the tooth-shaped member 341 may be provided in the piston rod 260. That is, the piston rod 260 may have an axial guide groove 261. The first stop position 3412 and the second stop position 3413 of the tooth-shaped member 341 relative to the piston rod 260 can be configured as two axial ends of the guide groove 261. In this way, an axial relative movement of the tooth-shaped member 341 and the piston rod 260 can take place in the guide groove 261 between the first stop position 3412 and the second stop position 3413.

It can be understood that, in order to realize the axial relative movement of the tooth-shaped member 341 and the piston rod 260, a dimensional difference between the axial length of the guide groove 261 and the axial length of the tooth-shaped member 341 is necessary. The dimensional difference can be preset, for example, according to the gap between the abrasive block 310 and the wheel tread when cleaning is not performed. That is, the dimensional difference needs to be within a preset range.

In some embodiments of the present application, the second tooth surface meshing portion 3421a of the latch head portion 3421 may comprise a plurality of tooth portions, here for example, may comprise 2, 3, or 4, etc. These tooth portions are each capable of meshing with the first tooth surface meshing portion 3411 in a form-fitting manner.

In order to adjust the gap more reliably, the tooth-shaped member 341 can be configured to move towards the wheel tread relative to the latch head portion 3421 unidirectionally in the axial direction. A reverse movement is not possible for the tooth-shaped member 341.

In order to realize the unidirectional movement described above, in some embodiments of the present application, the tooth surface angle of the first tooth surface meshing portion 3411 of the tooth-shaped component 341 may be designed. For example, viewed in conjunction with FIG. 4, the angle of the right meshing surface of the first tooth surface meshing portion 3411 relative to the plane of the tooth-shaped member 341 is 40-50 degrees, such as 41, 42, 43, 44, 45, 46, 47, 48, 49 degrees and other reasonable angles. The angle of the left meshing surface of the first tooth surface meshing portion 3411 relative to the plane of the tooth-shaped member 341 is 70-80 degrees, such as 71, 72, 73, 74, 75, 76, 77, 78, 79 degrees and other reasonable angles. Such a design ensures that the movement of the tooth-shaped member 341 in a direction away from the wheel tread becomes difficult based on the angle design of the meshing surface.

With continued reference to FIG. 4, it can be seen that the latch mechanism 342 may also have a protruding shoulder 3423 that connects the latch head portion 3421 and the latch rod portion 3422. In some embodiments of the present application, the reset elastic member 343 may be sleeved on the latch rod portion 3422 and sat on the protruding shoulder 3423 with one end.

In order to ensure the stability of the latch head portion 3421 when the tooth-shaped member 341 slides over the second tooth surface meshing portion 3421a of the latch head portion 3421 and when the reset elastic member 343 applies an elastic force to the second tooth surface meshing portion 3421a to move it, in some embodiments of the present application, the gap adjustment device may further be provided with a guide element 345 for guiding the movement of the latch head portion 3421. Here, the guide element 345 can be configured, for example, as a sleeve 344 with a T-shaped cross-section, which, as shown in FIG. 4, can be sleeved on the latch head portion 3421.

In addition, in some embodiments of the present application, the latch mechanism 342 may further be provided with a latch cover that secures an axial end of the reset elastic element that is away from the protruding shoulder 3423 and surrounds the reset elastic element.

In addition, for the gap adjustment device disclosed in the present application, the number of teeth of the second tooth surface meshing portion 3421a of the latch head portion 3421 and/or the tooth pitch between the first tooth surface meshing portion 3411 and the second tooth surface meshing portion 3421a can be selectively designed according to the required gap adjustment accuracy, so as to meet various gap adjustment accuracy requirements.

With continued reference to the drawings, it can be seen that a gap adjustment device 340 in another structural form may also be provided for the tread cleaner 300 according to the present application. For the convenience of description, the corresponding x direction, y direction and z direction are defined in FIGS. 6 to 11, wherein, the direction in which the piston rod of the tread cleaner is located is defined as the x direction, the direction of the height of the tread cleaner is defined as the z direction, and the y direction is perpendicular to the x direction and the z direction. For the convenience of clear description, the positive direction of the x direction is directed to the front end of the tread cleaner, and correspondingly, the negative direction of the x direction is directed to the rear end of the tread cleaner. Also, in the following description for FIGS. 6 to 11, orientation terms such as "front" and "rear" are defined with respect to the x direction, orientation terms such as "left" and "right" are defined with respect to the y direction, and orientation terms such as "upper" and "lower" are defined with respect to the z direction. It should be understood that the definitions of these directions are for the description and clarification of the relative positions, which may change accordingly according to the change of the mounting orientations of the tread cleaner, etc.

Figure 6:
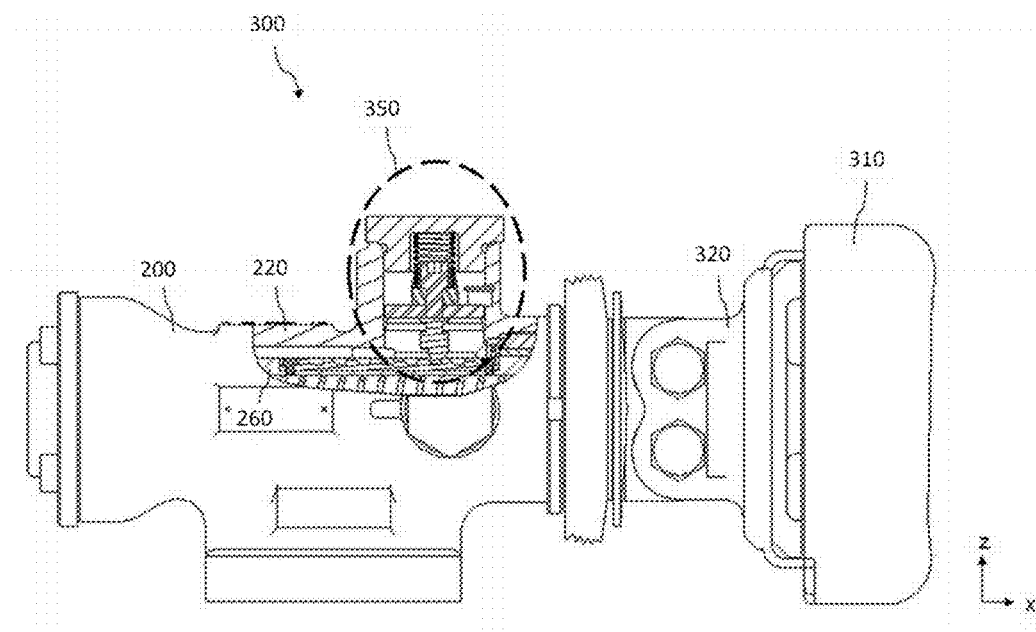
FIG. 6 is a front view of a tread cleaner of an embodiment of the present application, in which a partial cross-sectional view corresponding to a gap adjustment device is shown.

As shown in FIG. 6, the tread cleaner 300 of some embodiments of the present application may be mounted corresponding to a wheel of a railway vehicle of some embodiments of the present application. The tread cleaner 300 has an abrasive block 310, and the working surface of the abrasive block 310 face towards the wheel tread of the wheel. When the tread cleaner 300 is triggered to clean the tread, the abrasive block 310 acts on the wheel tread of the wheel to generate friction, so that the wheel and the rail can maintain a relatively good adhesion state therebetween. The specific structure and/or material, etc. of the abrasive block 310 is not limited.

Figure 7:
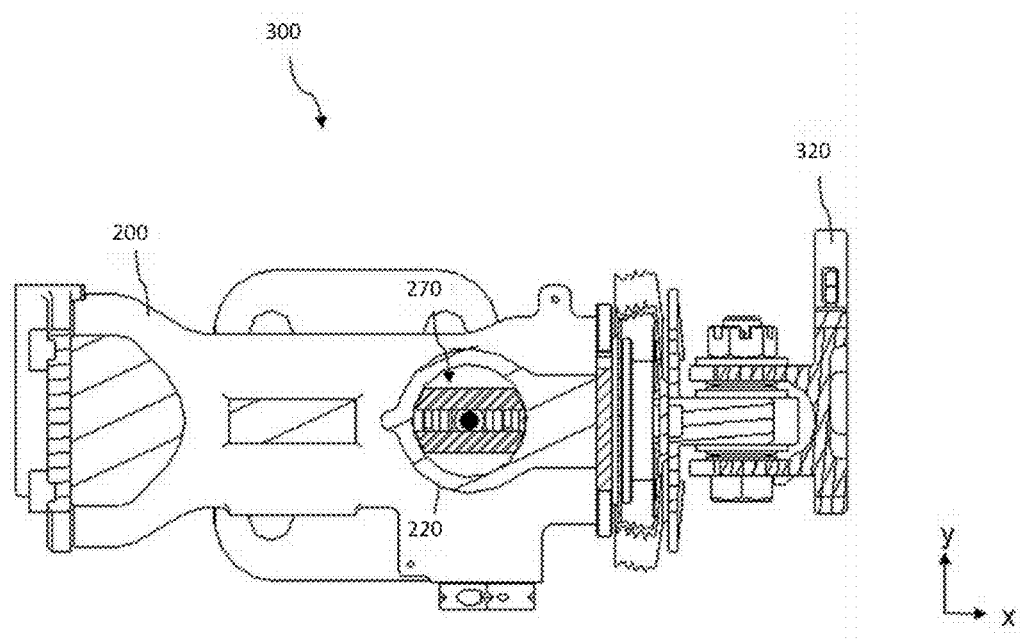
FIG. 7 is a top view of a tread cleaner of an embodiment of the present application.

With continued reference to FIG. 6 and FIG. 7, the tread cleaner 300 further comprises a brake head 320, a cylinder 200, etc. The abrasive block 310 is mounted on the brake head 320, while the specific mounting method is not limited. The brake head 320 can be connected to the piston rod 260 of the cylinder 130 through a connecting portion (such as a brake head connecting device). For example, the front end of the piston rod 260 is connected to the connecting portion through a shockproof rubber or a disc spring, so that the vibration shock can be effectively damped, and uneven wear of the abrasive block 310 can be prevented. Therefore, the cylinder 200 can drive the abrasive block 310 to frictionally act on the wheel tread via the connecting portion, the brake head 320 and the like.

In an embodiment, the cylinder 200 mainly comprises a cylinder barrel 220 and a piston rod 260, and may also comprise a guide rod, a restoring spring, a sealing member, a rear cylinder cover and other components. The inlet air pressure inside the cylinder barrel 220 can be controlled, so that the cylinder 200 can output power that causes the abrasive block 310 to act on the wheel tread of the wheel in a controlled manner. The piston rod 260 is located inside the cylinder barrel 220 and is located on the central axis of the cylinder barrel 220 in the x direction. Under the push of the inlet pressure, the piston rod 260 can move back and forth in the x direction as shown in FIG. 6 and FIG. 7. When the piston rod 260 moves forward, the cylinder 200 will push the abrasive block 310, etc. to move towards the wheel tread, and the gap between the working surface of the abrasive block 310 and the wheel tread decreases until the working surface of the abrasive block 310 contacts the wheel tread. When the piston rod 260 moves backward during the retraction movement, the abrasive block 310 can be reset, and the gap between the working surface and the wheel tread is reset. Wherein, the stroke range of the piston rod 260 will primarily determine the size of the gap between the working surface of the abrasive block 310 and the wheel tread.

Considering that the gap size changes due to, for example, the wear of the working surface of the abrasive block 310 during use (for example, with the wear of the working surface of the abrasive block 310, after the abrasive block 310 is reset, the size of the gap between its working surface and the wheel tread is constantly increasing), a gap adjustment device 350 is correspondingly arranged on the tread cleaner 300 to automatically and dynamically adjust the stroke range of the piston rod 260, so that the size of the gap between the working surface of the abrasive block 310 and the wheel tread can be adjusted to be kept relatively identical, enabling the abrasive block 310 to better or more accurately contact the wheel tread.

As shown in FIG. 6 and FIG. 7, in a direction perpendicular to the central axis of the cylinder 200 (e.g., in the z direction), the cylinder barrel 220 partially protrudes upward and opens, thereby forming a gap adjustment device mounting hole 270. The gap adjustment device mounting hole 270, specifically, can be substantially cylindrical, and its central axis is substantially perpendicular to the xy plane, and of course, is also substantially perpendicular to the piston rod 260. The gap adjustment device mounting hole 270 is used to position and mount the gap adjustment device 350. The gap adjustment device 350 mainly comprises a movable latch 352, a latch base 353 and an elastic member 358 (e.g., a spring), wherein, the movable latch 352 is movably positioned and mounted on the latch base 353, and the elastic member 358 is arranged in a substantially z direction and exerts a down force downward on the latch base 353.

Corresponding to the movable latch 352 of the gap adjustment device 350, as shown in FIGS. 6 to 11, the piston rod 260 is provided with a tooth-formed component 351. Specifically, the tooth-formed component 351 can be, for example, a gear rack, which has a plurality of teeth 3511 arranged in parallel approximately in they direction, and tooth slots 3512 are formed between the adjacent teeth 3511 arranged in the front-rear direction. The latch head 3521 at the lower end of the movable latch 352 can be meshed with the tooth-formed component 351. For example, under the action of the down force provided by the elastic member 358, the latch head 3521 can be meshed into the tooth slot 3512 of the tooth-formed component 351.

In an embodiment, the tooth-formed component 351 is fixedly disposed on the piston rod 260 of the cylinder 200, so that the tooth-formed component 351 can move in complete synchronization with the piston rod 260 in the x direction. Specifically, the tooth-formed component 351 can be detachably fixed on the piston rod 260 through tooth-formed component fixing parts 3519 (e.g., bolts), or can be arranged integrally with the piston rod 260, for example, it is integrally processed with the piston rod 260. It will be understood that the arrangement of fixing the tooth-formed component 351 relative to the piston rod 260 is not restrictive. In some cases, the tooth-formed component 351 may be regarded as a part of the gap adjustment device 350 or a specially arranged component relative to the gap adjustment device 350. In some cases, the tooth-formed component 351 may also be regarded as a part of the piston rod 260.

Specifically, the piston rod 260 is also provided with a groove (not shown in the figure) facing towards the movable latch 352, and the tooth-formed component 351 (e.g., gear rack) is fixed in the groove in the x direction. Specifically, the groove may be formed by grooving on the circumferential surface of the piston rod 260, which is arranged in the front-rear direction of the piston rod 260. Specifically, the length of the tooth-formed component 351 can be set in advance based on the stroke of the piston rod 260 or the like.

In an embodiment, as shown in FIG. 8 to FIG. 11, the latch base 353 is limited in the gap adjustment device mounting hole 270 of the cylinder barrel 220, so that when the movable latch 352 mounted thereon slides back and forth, the latch base 353 is basically fixed in the xy plane. The shape of the latch base 353 can be specifically designed according to the inner shape of the gap adjustment device mounting hole 270. Optionally, the latch base 353 can be configured as a component that is non-rotating relative to the gap adjustment device mounting hole 270, that is, the latch base 353 can rotate in the gap adjustment device mounting hole 270, thereby, the latch base 353 and the movable latch 352 mounted thereon can be prevented from rotating in the xy plane relative to the tooth-formed component 351 during the working process. Of course, when being limited, the latch base 353 cannot move in the x direction or in the y direction, either.

Figure 10:
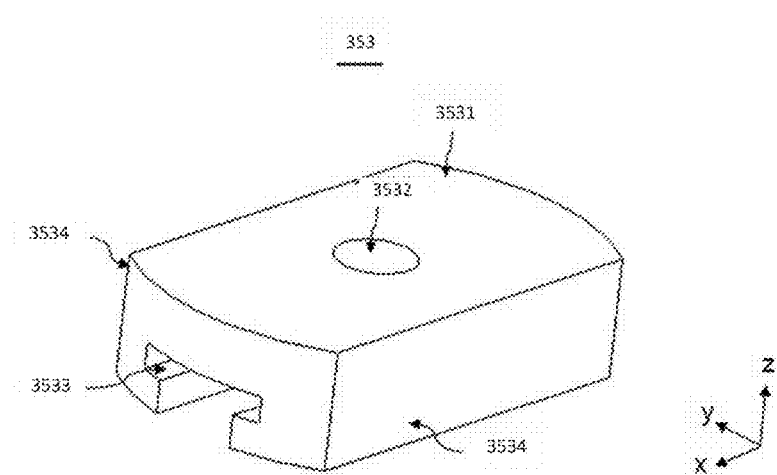
FIG. 10 is a schematic three-dimensional structural diagram of a latch base of a gap adjustment device of a tread cleaner of an embodiment of the present application.

Specifically, as shown in FIG. 10, the latch base 353 is overall in the shape of a double U and has limiting side faces 3534 that are substantially parallel to the xz plane. Two limiting side faces 3534 and the arc-shaped side faces at both ends together form a roughly double U shape structure. When the latch base 353 is seated in the gap adjustment device mounting hole 270, the limiting side faces 3534 can, together with the planar inner side faces in the gap adjustment device mounting hole 270 in contact with the limiting side faces 3534, prevent the latch base 353 from rotating relative to the gap adjustment device mounting hole 270.

Figure 8:
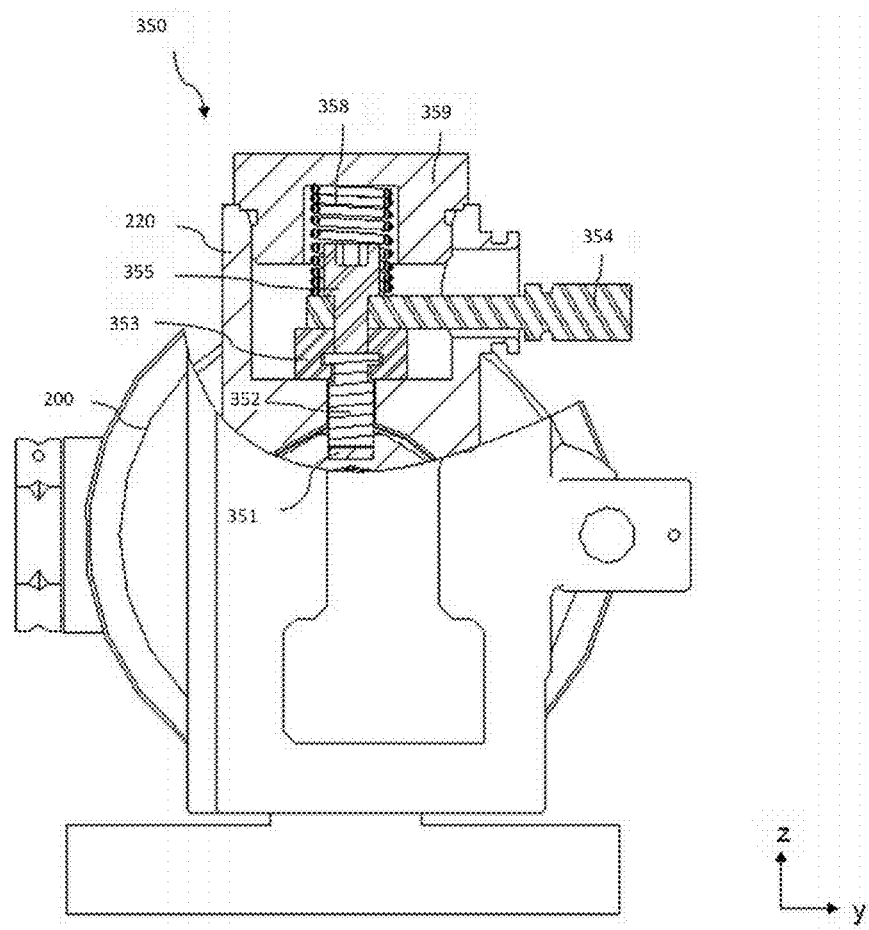
FIG. 8 is a right-side view of a tread cleaner of an embodiment of the present application.
Figure 9:
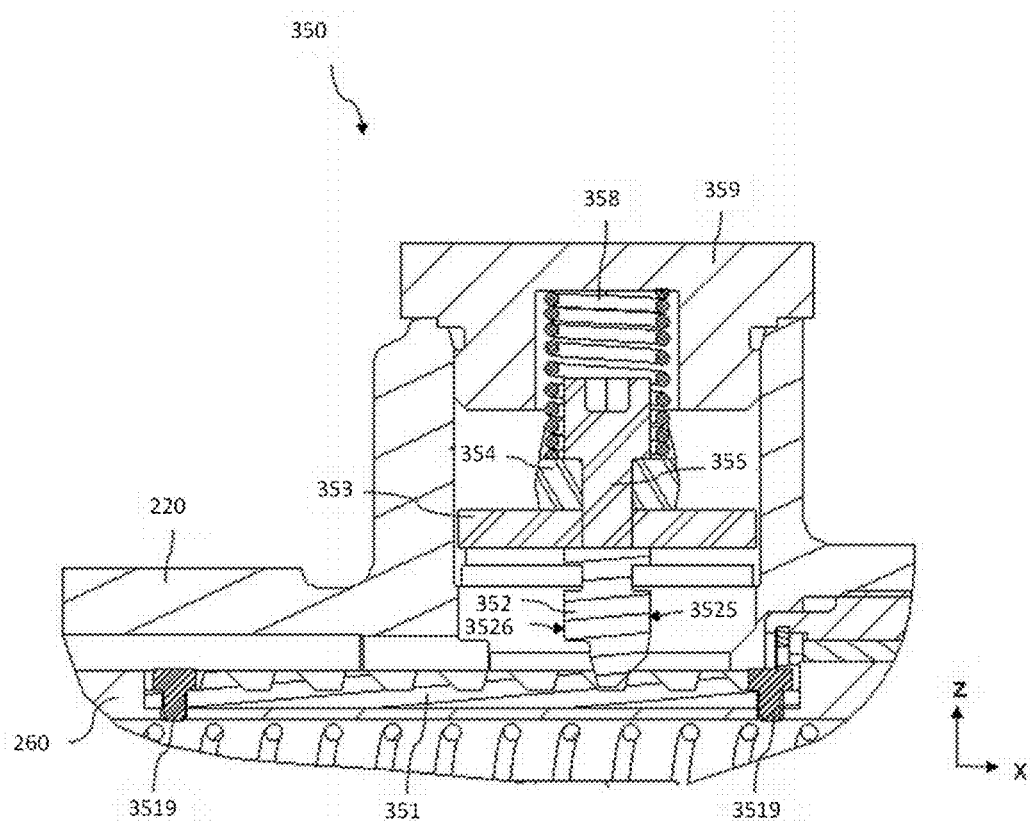
FIG. 9 is a partial cross-sectional view of a gap adjustment device of a tread cleaner of an embodiment of the present application.

With continued reference to FIG. 8 to FIG. 10, the upper end of the movable latch 352 is sleeved in a guide groove 3533 of the latch base 353 disposed along the x direction, and the movable latch 352 can, following the tooth-formed component 351 with which it meshes, move back and forth along the guide groove 3533 in the gap adjustment device mounting hole 270. As such, the latch 352 becomes a movable latch. Specifically, the guide groove 153 of the latch base 353 is a T-shaped groove, and the upper end of the movable latch 352 is correspondingly configured as a T-shaped joint. The T-shaped joint can be sleeved in the T-shaped groove and slide back and forth therein, which has good sliding reliability and accurate guidance, and is not easily damaged by impact.

With continued reference to FIG. 8 to FIG. 10, the rod portion of the movable latch 352 can be configured to be relatively thick and can collide with or abut against the inner side wall of the gap adjustment device mounting hole 270 during the forward and backward movement. In this way, the torque borne by the movable latch 352 will be greatly reduced, and the impact on the movable latch 352 during the working process will also be greatly reduced. The front side face 3525 of the rod portion of the movable latch 352 is correspondingly designed to match the shape of part of the inner side wall of the gap adjustment device mounting hole 270 that it collides with or abuts against, so that the front side face 3525 of the rod portion of the movable latch 352 and the part of the inner side wall of the gap adjustment device mounting hole 270 form a good surface contact when they collide with or abut against each other. Likewise, the rear side face 3526 of the rod portion of the movable latch 352 is correspondingly designed to match the shape of part of the inner side wall of the gap adjustment device mounting hole 270 that it collides with or abuts against, so that the rear side face 3526 of the rod portion of the movable latch 352 and the part of the inner side wall of the gap adjustment device mounting hole 270 form a good surface contact when they collide with or abut against each other. In this way, it is also beneficial to reduce the mutual impact between the movable latch 352 and the gap adjustment device mounting hole 270, which enables the movable latch 352 to have a longer service life and better reliability.

It should be noted that although the latch base 353 is limited in the gap adjustment device mounting hole 270, when the down force exerted by the elastic member 358 is cancelled or overcome, the latch base 353 can, for example, move upward in the gap adjustment device mounting hole 270 under the upward force transmitted by the movable latch 352.

In an embodiment, during the forward movement of the piston rod 260, after the movable latch 352 is driven by the tooth-formed component 351 to move forward until it abuts against the inner side wall of one side of the gap adjustment device mounting hole 270, the movable latch 352 overcomes the down force exerted by the elastic member 358 under the applied force transmitted by the tooth surface of the tooth-formed component 351, and slides between the tooth slots 3512 of the tooth-formed component 351. That is, during the forward movement process, the movable latch 352, after abutting against the inner side wall of one side of the gap adjustment device mounting hole 270, is not locked with the tooth-formed component 351, so that the piston rod 260 can continue to move forward, so that the abrasive block 310 can fully act on the wheel tread, even if the abrasive block 310 is constantly thinned by wear. In this way, as the abrasive block 310 wears continuously, the forward movement stroke of the piston rod 260 is lengthened.

When the grinding process temporarily ends, a reset is required to keep a certain gap between the working surface of the abrasive block 310 and the wheel tread, and the piston rod 260 will be driven to move backward. During the backward movement of the piston rod 260, the movable latch 352 is driven by the tooth-formed component 351 to move backward until it abuts against the inner side wall of the other side of the gap adjustment device mounting hole 270, then the movable latch 352 is locked in a certain tooth slot 3512 of the tooth-formed component 351, so as to prevent the piston rod 260 from continuing to move backward. That is, during the backward movement process, the movable latch 352, after abutting against the inner side wall of the other side of the gap adjustment device mounting hole 270, is locked with the tooth-formed component 351, so that the piston rod 260 cannot continue to move backward, so that the retraction stroke of the piston rod 260 is basically kept constant, even if the forward movement stroke of the piston rod 260 is lengthened due to the wear of the abrasive block 310 and other reasons. In this way, reducing of the retraction stroke due to the lock can substantially offset the thinning size of the abrasive block 310, and the working surface of the abrasive block 310 and the wheel tread maintain a substantially constant gap range after reset.

Figure 11:
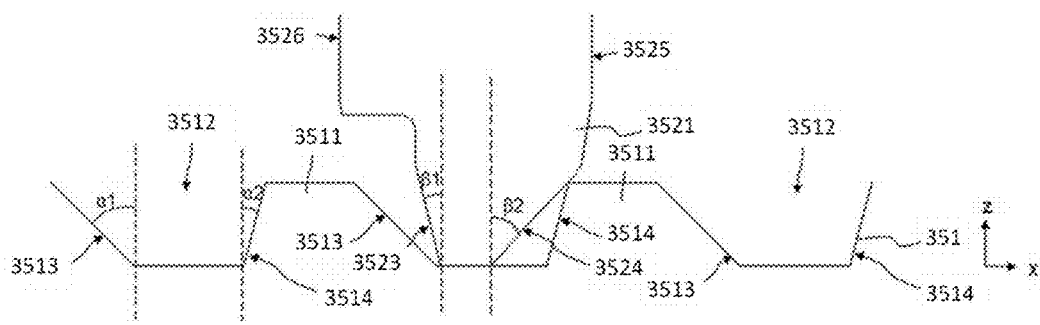
FIG. 11 is an enlarged schematic view of a meshing state between a movable latch and a tooth-formed component of the gap adjustment device of the embodiment shown in FIG. 9.

In order to realize that the tooth-formed component 351 can slide relative to the movable latch 352 when it moves forward but is locked relative to the movable latch 352 when it moves backward, the shapes of the latch head 3521 and the teeth 3511 that mesh with each other can be arranged. In an embodiment, as shown in FIG. 11, the included angle (β1 of the left meshing surface 3523 of the latch head 3521 of the movable latch 352 relative to the z direction is smaller than the included angle α1 of the right tooth surface 3513 of the tooth 3511 of the tooth-formed component 351 relative to the z direction. The included angle (β2 of the right meshing surface 3524 of the latch head 3521 of the movable latch 352 relative to the z direction is greater than the included angle α2 of the left tooth surface 3514 of the tooth 3511 of the tooth-formed component 351 relative to the z direction. For example, the included angle (β1 is equal to but not limited to about 15°, the included angle α1 is equal to but not limited to about 45°, the included angle β2 is equal to but not limited to about 45°, and the included angle α2 is equal to but not limited to about 25°.

With continued reference to FIG. 8 to FIG. 10, the tread cleaner 300 of the embodiments of the present application also has a manual relief function, and thus is further provided with a manual relief member 354, fixing bolts 355, etc. The manual relief member 354 is used to overcome, through an external force (e.g., an operator's force), the down force exerted by the elastic member 358 to disengage the movable latch 352 from the tooth-formed component 351 (e.g., tooth slot 3512), that is, to decouple the movable latch 352 and the tooth-formed component 351 from each other. Specifically, the manual relief member 354 may have an inner end and an outer end, wherein its inner end is arranged in the gap adjustment device mounting hole 270, and its outer end protrudes outward from the side wall of the gap adjustment device mounting hole 270 along the y direction. The outer end may be, for example, a handle, which can greatly facilitate manual operation. The fixing bolt 355 can mount the inner end of the manual relief member 354 between the upper surface 3531 of the latch base 353 and the elastic member 358. Specifically, the inner end of the manual relief member 354 may have a positioning and mounting hole, the fixing bolt 355 passes through the inner end of the manual relief member 354 (e.g., the positioning and mounting hole at the inner end), and the lower end of the fixing bolt 355 is threadedly fastened with the positioning and mounting hole 3532 of the latch base 353. The lower end of the elastic member 358 can abut against the upper surface of the inner end of the manual relief member 354, the upper end of the elastic member 358 can abut against the latch cover 359, and the down force exerted by the elastic member 358 can be transmitted to the latch base 353 through the manual relief member 354, and then transmitted to the movable latch 352. Therefore, the manual relief member 54 is easy to mount, and the existence of the manual relief member 354 does not affect the realization of the functions of the gap adjustment device 350 during normal operation.

When manual relief operation is required, manually applying external force from the outer end of the manual relief member 354, such as a handle, can overcome the down force exerted by the elastic member 358, and can move the latch base 353 and the movable latch 352 upward together, thereby manually unlocking the movable latch 352 relative to the tooth-formed component 351. The manual relief member 354 makes good use of the lever principle, making the relief operation convenient and easy, which saves time and effort, and is easy to operate.

With continued reference to FIG. 6, the latch cover 359 can be fixedly mounted on the upper end of the gap adjustment device mounting hole 270 and cover the gap adjustment device mounting hole 270.

When the tread cleaner 300 is in use, the piston rod 260 can extend and move forward together with the tooth-formed component 351. The right tooth surface 3513 of the tooth-formed component 351 acts on the latch head 3521 of the movable latch 352 to drive the movable latch 352 to move forward together along the guide groove 3533 until it collides with the inner wall of one side of the gap adjustment device mounting hole 270 and is limited. The piston rod 260 continues to extend forward, and the right tooth surface 3513 of the tooth-formed component 351 continues to act on the latch head 3521 of the movable latch 352. The movable latch 352 push up the latch base 353 under the action of the upward component force and moves upward along the gap adjustment device mounting hole 270, and the elastic member 358 is compressed. As the wear of the abrasive block 310 increases, the piston rod 260 will continue to extend forward, and the movable latch 352 will slide over the right tooth surface 3513 of the first tooth 3511 of the tooth-formed component 351 and then reset under the action of the elastic member 358 to mesh with another tooth slot 3512 on the tooth-formed component 351. As the stroke of the forward movement of the piston rod 260 continues to increase, the latch head 3521 of the movable latch 352 meshes with the tooth slots 3512 on the tooth-formed component 351 in succession. When the piston rod 260 is reset, the piston rod 260 first drives the abrasive block 310 back away from the wheel tread. At this time, the latch head 3521 of the movable latch 352 forms a self-lock with the left tooth surface 3514 of the tooth-formed component 351, and the tooth-formed component 351 drives the movable latch 352 to slide backward along the guide groove 3533 until the movable latch 352 collides with the inner wall of the other side of the gap adjustment device mounting hole 270 and is limited. Since the movable latch 352 and the tooth-formed component 351 are locked in the backward movement direction, the piston rod 260 will stop moving backward, so as to control the distance of the retraction stroke of the piston rod 260, so that the gap between the abrasive block 310 and the wheel tread can be kept in a constant range to achieve the purpose of flexibly adjusting the gap.

The gap adjustment principle of the tread cleaner 300 of the above embodiments is obviously different from the gap adjustment principle of the tread cleaners disclosed in, for example, the patents discussed in the background art. For example, the tooth-formed component 351 in the tread cleaner 300 does not slide in the groove (e.g., gear rack groove) of the piston rod 260, while the movable latch 352 can slide back and forth along the guide groove 3533 in the gap adjustment device mounting hole 270. The applicant has noticed that, in the existing tread cleaners, the gap adjustment is performed by means of the gear rack sliding in the piston rod, the latch being fixed, and the relative movement and lock caused by the latch head and the teeth of the gear rack being meshed with each other. Although the gap adjustment mechanism of the existing tread cleaners can keep the gap between the abrasive block and the wheel within a certain range, the gap adjustment is relatively inflexible, which will easily lead to the problems of the gear rack being jammed and bent. In addition, since the latch is relatively long and fixed, problems such as fracture, bending or falling off are prone to occur under high torque working conditions.

In the tread cleaner 300 of the embodiments of the present application, on the one hand, the tooth-formed component 351 (e.g., gear rack) is fixed on the piston rod 260 and does not need to move back and forth relative to the piston rod 260, so even if the cylinder driving torque is large and the working environment is poor, the tooth-formed component 351 basically does not have problems such as bending and jamming, which improves the working reliability of the tread cleaner 300 and reduces the maintenance work of the tread cleaner 300. On the other hand, the movable latch 352 can slide back and forth in the guide groove 3533 of the latch base 353, which can not only automatically realize the gap adjustment function, but also prevent the latch from fracture, bending, falling off and other problems (because the movable latch 352 abuts against the inner side wall of the gap adjustment device mounting hole 270 under high torque working conditions, the torque that the movable latch 352 bears is greatly reduced). In addition, the gap adjustment device 350 of the tread cleaner 300 according to the embodiments of the present application has a simple structure, and it is easy to disassemble, easy to maintain, and has good operation reliability.

In the tread cleaner 300 of the embodiments of the present application, it is also easy to integrate a manual relief member 354, which is convenient and easy to operate and does not affect the gap adjustment function.

With continued reference to the drawings, an embodiment of a tread cleaner having a mounting base is also provided below. Also, in the following description of FIGS. 12 to 21, orientation terms such as "front" and "rear", "upper" and "lower" are defined relative to the mounting orientations of the tread cleaner shown in the drawings. It should be understood that the definitions of these directions are for the description and clarification of the relative positions, which may change accordingly according to the change of the mounting orientations of the tread cleaner, etc.

Figure 12:
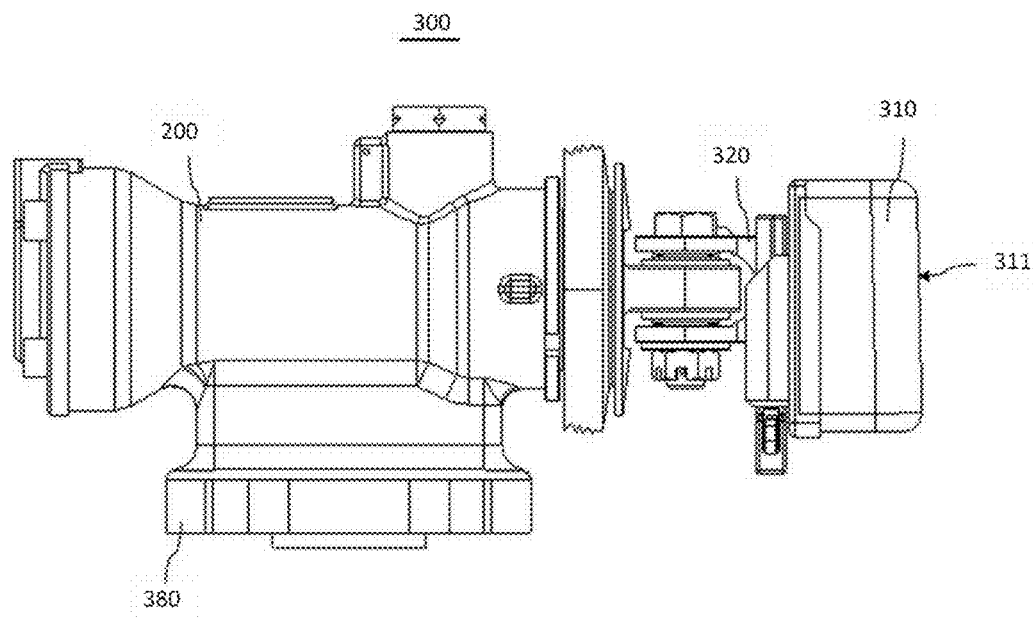
FIG. 12 is a front view of a tread cleaner of an embodiment of the present application, in which a mounting base of an embodiment of the present application included therein is shown.
Figure 13:
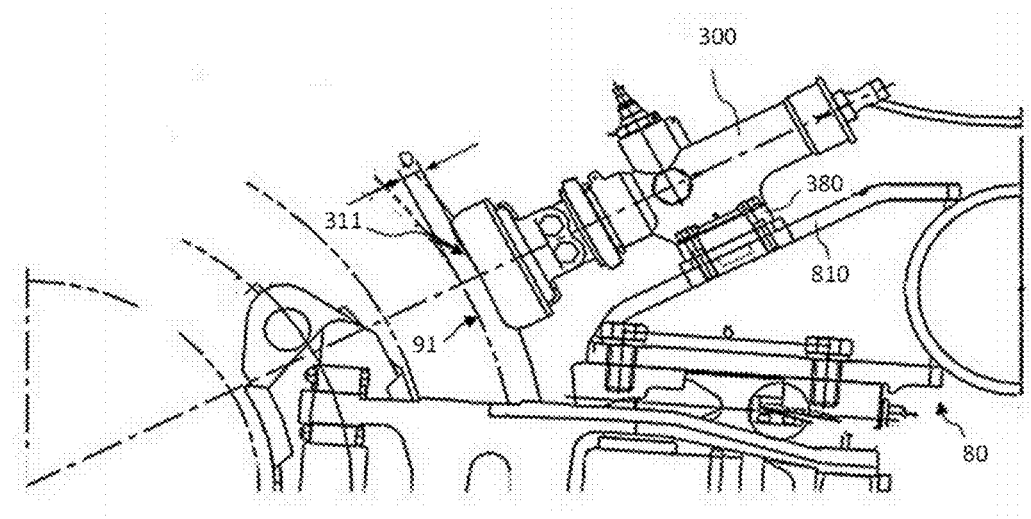
FIG. 13 is a partial schematic structural diagram of a railway vehicle using a tread cleaner of an embodiment of the present application, in which a schematic view of the mounting of a tread cleaner relative to a wheel which it grinds is shown.

As shown in FIGS. 12 and 13, the tread cleaner 300 of some embodiments of the present application may be mounted corresponding to the wheel of a railway vehicle of some embodiments of the present application. The tread cleaner 300 has an abrasive block 310. The working surface of the abrasive block 310 (e.g., the abrasive surface 311) faces towards the wheel tread 91 of the wheel. When the tread cleaner 300 is triggered to clean the tread, the abrasive block 310 acts on the wheel tread 91 of the wheel to generate friction, so that the wheel and the rail can maintain a relatively good adhesion state. The specific structure and/or material, etc. of the abrasive block 310 is not limited.

With continued reference to FIG. 12 and FIG. 13, the tread cleaner 300 further comprises a brake head 320, a cylinder 200, etc.; the abrasive block 310 is mounted on the brake head 320, while the specific means of mounting the abrasive block 310 is not limited. The brake head 320 can be connected to the piston rod of the cylinder 130 through a connecting portion (such as a brake head connecting device). For example, the front end of the piston rod is connected to the connecting portion through a shockproof rubber and a disc spring, so that the vibration shock can be effectively damped, and uneven wear of the abrasive block 310 can be prevented. Therefore, the cylinder 200 can drive the abrasive block 310 to frictionally act on the wheel tread 91 via the connecting portion, the brake head 320 and the like.

With continued reference to FIG. 12 and FIG. 13, the tread cleaner 300 further comprises a mounting base 380 used to realize the fixed mounting of the tread cleaner 300, for example, to fixedly mount the tread cleaner 300 on the corresponding tread cleaner bearing portion 810 of the bogie 80, so as to realize the positioning and mounting of the tread cleaner 300 with respect to the wheel or the wheel tread 91 of the railway vehicle. When the tread cleaner 300 is fixedly mounted, in a static state, the gap between the wheel tread 91 and the abrasive surface 311 is about D. The methods of connecting the mounting base 380 with the tread cleaner 300 are not limited, for example, the mounting base 380 can be connected with the cylinder body of the cylinder 200 (for example, using an integral connection method, a detachable connection method, or an obliquely and rotationally adjustable connection method); the orientation of the mounting base 380 on the tread cleaner 300 is not limited, either.

In some embodiments of the present application, the mounting base 380 has its own mounting and positioning function during the mounting process. The mounting and positioning function is realized by means of a first positioning and matching portion 383 as shown in FIG. 12 to FIG. 21. The first positioning and matching portion 383/385 is disposed on the bottom mounting surface 389 of the mounting base 380. Specifically, the mounting base 380 has a base plate 381, and the lower surface of the base plate 381 is correspondingly the bottom mounting surface 389, which will be matched with the mounting and matching surface 819 (i.e., the bearing surface) of the fixedly mounted tread cleaner bearing portion 810 on the surfaces thereof facing each other. Correspondingly, on the railway vehicle of some embodiments of the present application, the tread cleaner bearing portion 810 of the bogie 80, for example, is provided with a second positioning and matching portion 811/813. According to the matching requirements, the shape and/or size, etc. of the second positioning and matching portion 811/813 can be correspondingly designed according to the shape and/or size, etc. of the first positioning and matching portion 383/385, so that in the process of mounting the tread cleaner 300 on the tread cleaner bearing portion 810, the first positioning and matching portion 383/385 and the second positioning and matching portion 811/813 can be matched with each other, and such a match can prevent the tread cleaner 300 from sliding down relative to the oblique mounting and matching surface 819, thereby easily solving the problem that the tread cleaner 300 slides down relative to the mounting and matching surface 819 due to its own force of gravity during the mounting process. And, as such, the mounting and positioning of the tread cleaner 300 on the bogie is easier, saving labor costs and mounting time.

In the embodiment shown in FIG. 14 to FIG. 19, the first positioning and matching portion 383 is specifically a first positioning and matching convex portion 383, and correspondingly, the second positioning and matching portion 811 is specifically a first positioning and matching concave portion 811 provided corresponding to the first positioning and matching convex portion 383. Wherein, the first positioning and matching convex portion 383 at least partially protrudes into the first positioning and matching concave portion 811, for example, is embedded in the first positioning and matching concave portion 811 so as to be positioned in the first positioning and matching concave portion 811, which in turn provides a mounting location for the tread cleaner 300 before the latches are tightened.

Figure 14:
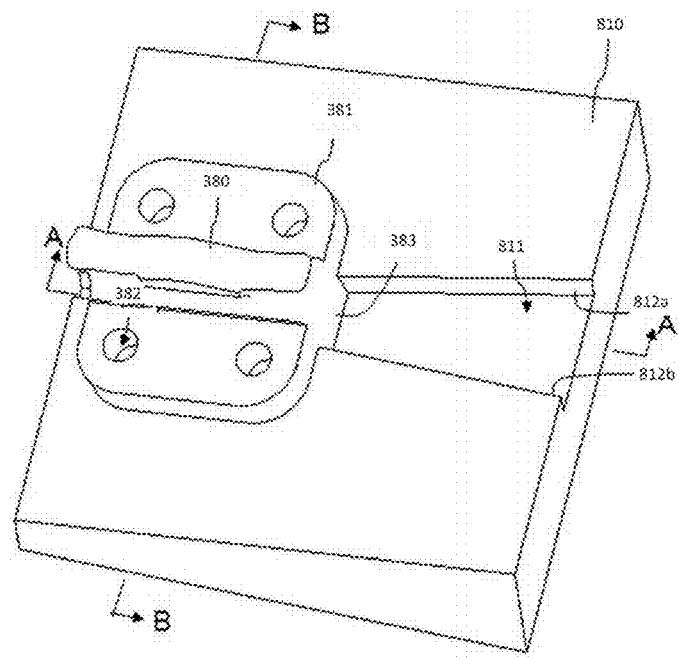
FIG. 14 is a schematic structural diagram of a mounting base and a tread cleaner bearing portion to which it is matched and mounted according to an embodiment of the present application.
Figure 15:
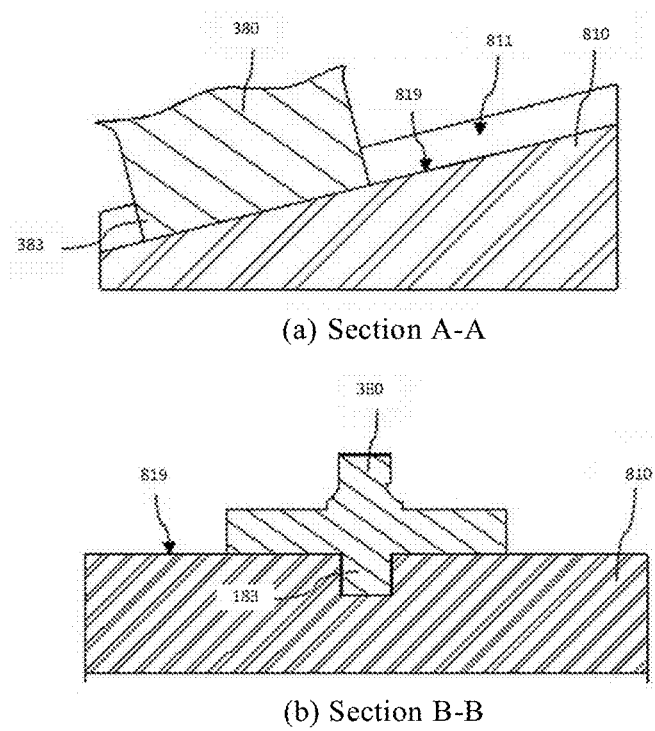
FIG. 15 is a cross-sectional view of the mounting base of an embodiment shown in FIG. 14 being positioned and mounted on the tread cleaner bearing portion of an embodiment, in which (a) is a cross-sectional view of A-A, and (b) is a cross-sectional view of B-B.
Figure 16:
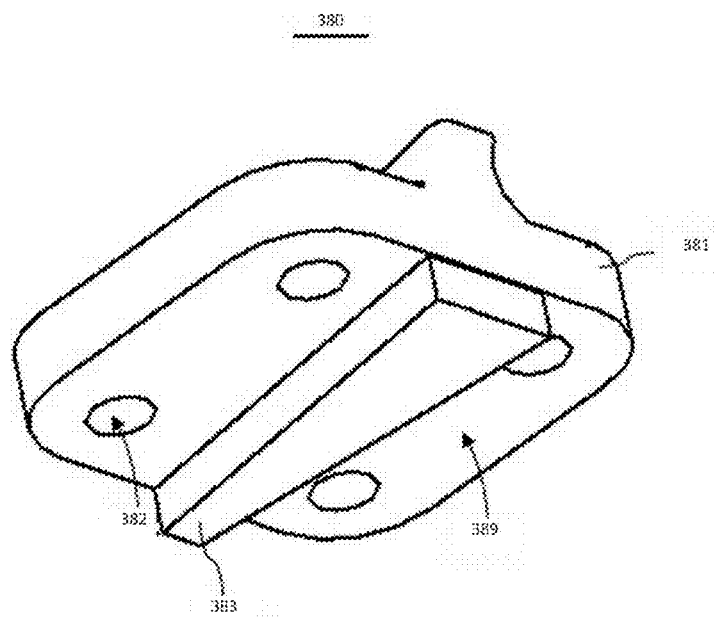
FIG. 16 is a schematic three-dimensional structural diagram of the mounting base of an embodiment of the present application used in FIG. 14.

In the mounting base 380 of the first embodiment in FIG. 14 to FIG. 16 and the tread cleaner bearing portion 810 of the first embodiment with which the mounting base 380 matches, the first positioning and matching convex portion 383 is a wedge-shaped block (e.g., a trapezoidal block), and the first positioning and matching concave portion 811 is a wedge-shaped groove (e.g., a trapezoidal groove). Wherein, the groove opening of the wedge-shaped groove gradually narrows down from high to low along the inclined mounting and matching surface 819; the wedge-shaped groove has two wedge-shaped side edges 812a and 812b, and the inclination angles of the wedge-shaped side edges 812a and 812b are respectively the same as the inclination angles of the wedge-shaped side faces of the wedge-shaped block. During the mounting process, the wedge-shaped block can first be placed in the wide open section of the wedge-shaped groove, and when the wedge-shaped block slides obliquely downward in the wedge-shaped groove to a predetermined position under the force of gravity of the tread cleaner 300, the two wedge-shaped side faces of the wedge-shaped block respectively abut against the two wedge-shaped side edges 812a and 812b of the wedge-shaped groove, so that the mounting base 380 is prevented from continuing to slide down, and the mounting base 380 is positioned on the tread cleaner bearing portion 810 without manual external force for fixation. The mounting position provided by the mounting base 380 can, for example, prevent the tread cleaner 300 from continuing to slide down or rotate relative to the tread cleaner bearing portion 810, and also facilitate subsequent bolt tightening operations.

Specifically, the base plate 381 of the mounting base 380 is provided with a plurality of (for example, four) bolt fastening holes 382, and correspondingly, a plurality of (for example, four) bolt fastening holes (not shown in the figures) may also be provided on the tread cleaner bearing portion 810. When tightening the tread cleaner 300, the respective tightening bolts pass through the bolt tightening holes 382 on the base plate 381 and the bolt tightening holes of the tread cleaner bearing portion 810, respectively, and then thread fastening is performed.

In order to prevent falling off, the opposite wedge-shaped side edges 812a and 812b can also be arranged inwardly from bottom to top with respect to each other, that is, each wedge-shaped side edge is inclined inward in the bottom-to-top direction, so that the upper opening of the wedge-shaped groove forms a closing-in structure relative to the bottom surface thereof, and the width dimension of the upper opening of the wedge-shaped groove is smaller than the width dimension of the bottom surface of the wedge-shaped groove. Correspondingly, the two wedge-shaped side faces of the wedge-shaped block are also arranged inwardly from bottom to top with respect to each other, that is, each wedge-shaped side face is inclined inward in the bottom-to-top direction. In this way, when the wedge-shaped block slides obliquely downward to a predetermined position in the wedge-shaped groove (the two wedge-shaped side faces of the wedge-shaped block abut against the two wedge-shaped side edges 812a and 812b of the wedge-shaped groove, respectively), the wedge-shaped block is limited in the wedge-shaped groove, which not only provides mounting and positioning, but also prevents the wedge-shaped block from falling off from the wedge-shaped groove, thereby making it convenient for the operator to perform the subsequent thread fastening operations. In addition, this falling prevention function can also bring about the following effects: (1) During the operation of the railway vehicle, the wedge-shaped fitting between the wedge-shaped block and the wedge-shaped groove can share part of the force borne by the fastening bolts, thereby improving the safety factor of the tightening bolts, so that the tightening bolts are not easy to break under complex working conditions, and the requirements for tightening bolts are reduced; (2) Even if the tightening bolts break during the operation of the railway vehicle, such a wedge-shaped fitting between the wedge-shaped block and the wedge-shaped groove has the falling prevention function, which can also prevent the tread cleaner from falling off during the operation process, thereby ensuring the safe operation of the railway vehicle.

As shown in FIG. 15, the convex height of the second positioning and matching convex portion 813 may be equal to the concave depth of the second positioning and matching concave portion 385 or may be smaller than the concave depth of the second positioning and matching concave portion 385.

Figure 17:
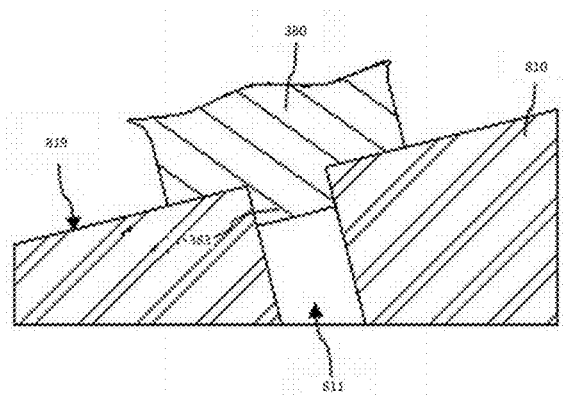
FIG. 17 is a cross-sectional view of a mounting base of another embodiment of the present application being positioned and mounted on a tread cleaner bearing portion of another embodiment at the time when the two are positioning and mounting to each other.
Figure 18:
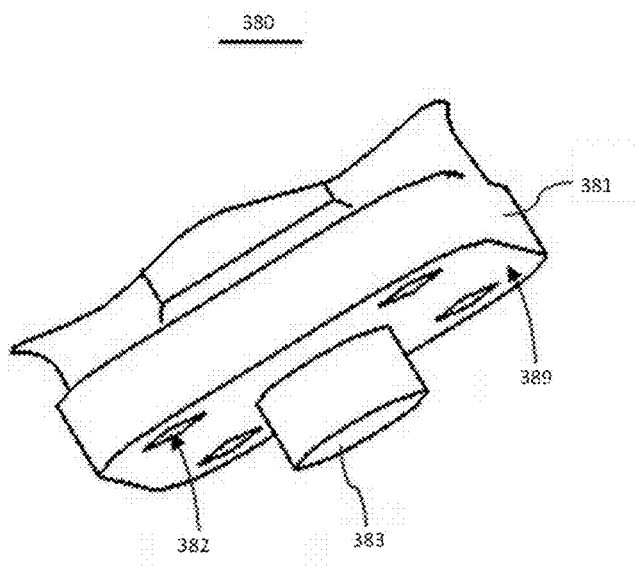
FIG. 18 is a schematic three-dimensional structural diagram of a mounting base of another embodiment of the present application.

FIG. 17-FIG. 18 provide a mounting base 380 and a tread cleaner bearing portion 810 according to the second embodiment, which is an alternative modification of the mounting base 380 and the tread cleaner bearing portion 810 according to the first embodiment. Wherein, the first positioning and matching convex portion 383 of the mounting base 380 is configured in a cylindrical shape. Correspondingly, the first positioning and matching concave portion 811 of the tread cleaner bearing portion 810 is configured as a circular hole. The first positioning and matching convex portion 383 in a cylindrical shape and the first positioning and matching concave portion 811 in a circular hole shape may have substantially the same radial dimensions.

Figure 19:
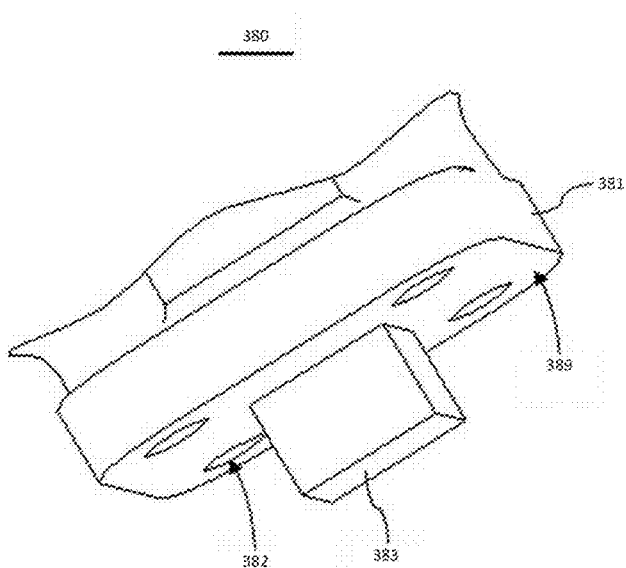
FIG. 19 is a schematic three-dimensional structural diagram of a mounting base of still another embodiment of the present application.

FIG. 19 provides a mounting base 380 of the second embodiment, wherein the first positioning and matching convex portion 383 of the mounting base 380 is configured in a rectangular column shape, for example, a square column shape. Correspondingly, the first positioning and matching concave portion 811 of the tread cleaner bearing portion 810 may be configured as a rectangular hole (not shown in the figure). The first positioning and matching convex portion 383 of a rectangular column shape and the first positioning and matching concave portion 811 of a rectangular hole shape may have substantially the same rectangular dimensions.

In the process of mounting the tread cleaner, the first positioning and matching convex portion 383 in a rectangular column shape or cylindrical shape can fall into the first positioning and matching concave portion 811 in a rectangular hole or circular hole shape, thereby preventing the tread cleaner 300 from continuing to slide down relative to the tread cleaner bearing portion 810, and also providing a mounting and positioning function.

It should be noted that, when the principle of matching the first positioning and matching portion of the mounting base 380 and the second positioning and matching portion of the tread cleaner bearing portion 810 taught in the above embodiments is applied to improve mounting and positioning, it will be understood that the corresponding features of the first positioning and matching portion and the corresponding features of the second positioning and matching portion can be exchanged with each other, and the mounting and positioning function can also be realized.

Figure 20:
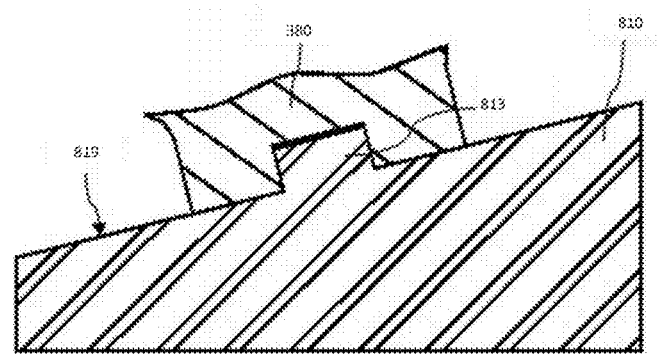
FIG. 20 is a cross-sectional view of a mounting base of still another embodiment of the present application being positioned and mounted on a tread cleaner bearing portion of still another embodiment at the time when the two are positioning and mounting relative to each other.
Figure 21:
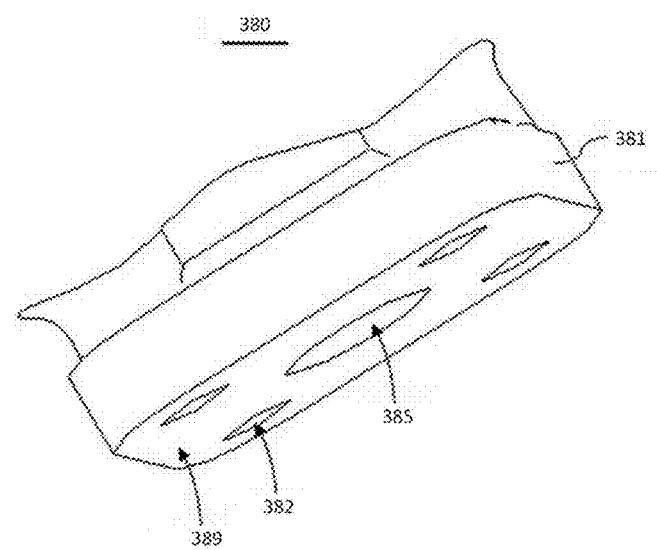
FIG. 21 is a schematic three-dimensional structure diagram of a mounting base according to yet another embodiment of the present application.

In an embodiment, as shown in FIG. 20 and FIG. 21, a first positioning and matching portion 385 may be a second positioning and matching concave portion 385, and a second positioning and matching portion 813 may be a second positioning and matching convex portion 813 provided corresponding to the second positioning and matching concave portion 385. Wherein, the second positioning and matching convex portion 813 at least partially protrudes into the second positioning and matching concave portion 385 to provide the mounting and positioning function. As for the mounting base 380 of the fourth embodiment and the tread cleaner bearing portion 810 of the fourth embodiment shown in FIG. 20 and FIG. 21, it is obtained by modifying the mounting base 380 and the tread cleaner bearing portion 810 of the embodiment shown in FIG. 17 and FIG. 18. Wherein, the second positioning and matching concave portion 385 of the mounting base 380 is formed by recessing upward from the bottom mounting surface 389 of the base plate 381, and the second positioning and matching convex portion 813 is formed by protruding upward from the mounting and matching surface 819 of the tread cleaner bearing portion 810. Specifically, the second positioning and matching convex portion 813 of the tread cleaner bearing portion 810 is configured in a cylindrical shape, and correspondingly, the second positioning and matching concave portion 385 of the mounting base 380 is configured as a circular hole. The second positioning and matching convex portion 813 in a cylindrical shape and the second positioning and matching concave portion 385 in a circular hole shape may have substantially the same radial dimensions.

It will be understood that, in other alternative embodiments, specifically, the second positioning and matching convex portion 813 of the tread cleaner bearing portion 810 is configured in a rectangular column shape, and correspondingly, the second positioning and matching concave portion 385 of the mounting base 380 is configured as a rectangular hole.

It will be understood that, under the teachings of the above embodiments shown in FIG. 20 and FIG. 21, the matching portion of the mounting base 380 and the matching portion of the tread cleaner bearing portion 810 according to the embodiment shown in FIG. 14 to FIG. 16 may also be exchanged. That is, the second positioning and matching convex portion 813 on the tread cleaner bearing portion 810 is configured as a wedge-shaped block, and the second positioning and matching concave portion 385 on the mounting base 380 is configured as a wedge-shaped groove. Wherein, the groove opening of the wedge-shaped groove gradually narrows down from low to high along the obliquely mounted mounting and matching surface 819. When the wedge-shaped groove moves obliquely downward relative to the wedge-shaped block to a predetermined position, the two wedge-shaped side faces of the wedge-shaped block respectively abut against the two wedge-shaped side edges of the wedge-shaped groove. In order to add a falling prevention function, the wedge-shaped side edges of the wedge-shaped groove are inclined inward in the top-to-bottom direction, so that the lower opening of the wedge-shaped groove forms a closing-in structure relative to its upper bottom surface. Correspondingly, the wedge-shaped side faces of the wedge-shaped block against which the wedge-shaped side edges abut also inclined inwardly in a top-to-bottom direction. In this way, when the wedge-shaped groove slides down obliquely to a predetermined position (the two wedge-shaped side faces of the wedge-shaped block respectively abut against the two wedge-shaped side edges of the wedge-shaped groove), the wedge-shaped block of the tread cleaner bearing portion 810 is limited in the wedge-shaped groove, which not only provides mounting and positioning, but also prevents the wedge-shaped block from falling off from the wedge-shaped groove, thereby making it convenient for the operator to perform subsequent thread fastening operations.

The mounting base 380, the tread cleaner 300 using the mounting base, and the railway vehicle of the above embodiments can have at least one of the following effects:

(1) The problem that the obliquely-mounted tread cleaner has no mounting and positioning function before it is bolted is solved, which avoids the risk of slipping, and saves the time and manpower of manually positioning the tread cleaner through holding by hand, so that the mounting is easier, time-saving and labor-saving, and it also facilitates the subsequent operations of the fastening bolts.

(2) During the use of the tread cleaner after mounting, the mounting and positioning function provided by the mounting base 380 can continue to play an effective role, for example, when used in conjunction with the fastening bolts, it can share the bearing force of the fastening bolts and improve the safety factor of the fastening bolts; in addition, when the bolt is broken due to abnormal conditions, the mounting and positioning function can prevent the tread cleaner 300 from falling off when an falling prevention function is further provided, thereby ensuring the safe operation of the railway vehicle.

Although the above examples describe only some of the embodiments of the present application, those skilled in the art will appreciate that the present application may be implemented in many other forms without departing from the spirit and scope of the present application, for example, a first positioning and matching convex portion 383 and a second positioning and matching concave portion 385 are provided on the mounting base 10 at the same time, and a first positioning and matching concave portion 811 and a second positioning and matching convex portion 813 are correspondingly provided on the tread cleaner bearing portion 810 at the same time.

In addition, although not shown in the figures, the present application further provides a railway vehicle on which any embodiments or combinations of the embodiments of the aforementioned end cover assembly 100, or any embodiments or combinations of the embodiments of the aforementioned cylinders 200, or any embodiments or combinations of the embodiments of the aforementioned tread cleaner 300 may be provided, according to application requirements, thereby also having the technical effects brought about by the aforementioned technical solutions. It should be noted that the aforementioned railway vehicles may include, but are not limited to, subway locomotives, high-speed rail locomotives, bullet trains, urban light-rail trains and other types of vehicles.

It should be noted that the end cover assembly, the cylinder, the tread cleaner and other parts in the railway vehicle provided according to the present application can be designed, manufactured and sold separately, or they can be assembled together and then sold as a whole. Regardless of the monomers formed before the combination or the whole formed after the combination, they all fall within the protection scope of the present application.

The end cover assembly, the cylinder, the tread cleaner and the railway vehicle according to the present application are described in detail above by way of example only. These examples are only used to illustrate the principles and implementations of the present application, rather than limit the present application. Those skilled in the art can also make various modifications and improvements without departing from the spirit and scope of the present application. Therefore, all equivalent technical solutions should belong to the scope of the present application and be defined by the various claims of the present application.

What is claimed is:

1. An end cover assembly for sealing an air inlet end of a cylinder of a tread cleaner, comprising:
   a cylinder cover having an inner side end face disposed towards the cylinder and an outer side end face disposed away from the cylinder; a first external thread column body extending and protruding is provided on an inner side end face of the cylinder cover, and is mounted matching the cylinder and a second external thread column body extending and protruding is provided on an outer side end surface of the cylinder cover; the cylinder cover is provided with a through mounting hole extending through the first external thread column body and the second external thread column body and is used for arranging an air core and an elastic pull rod; and a gland having an inner side end face disposed towards the cylinder cover and an outer side end face disposed away from the cylinder cover, wherein, a threaded hole matching the second external thread column body is provided on the inner side end face of the gland, and a throttle air vent hole is provided between the threaded hole and the outer side end face of the gland;

wherein, a first mounting groove is further provided between the inner side end face and the threaded hole of the gland; in an assembled state, the gland is assembled to the cylinder cover and pressed against the second external thread column body to enclose it by the fit between the threaded hole with the second external thread column body, and the inner side end face of the gland abuts against the outer side end face of the cylinder cover and sealing is provided via a sealing rings disposed in the first mounting groove, wherein, a first column body extending and protruding is provided on an inner side end face of the first external thread column body disposed towards the cylinder, diameter of the first column body being smaller than diameter of the first external thread column body; wherein, the first external thread column body is matched with a supporting cylinder liner of the cylinder, and the first column body is matched with a cylinder barrel of the cylinder, and wherein, a second mounting groove is provided between the first external thread column body and the inner side end face of the cylinder cover, and in an assembled state, sealing for the supporting cylinder liner of the cylinder and the first external thread column body is provided via a sealing ring disposed in the second mounting groove; and/or a third mounting groove is provided on a side wall of the first column body, and in an assembled state, sealing for the cylinder barrel of the cylinder and the first column body is provided via a sealing ring disposed in the third mounting groove.

2. The end cover assembly according to claim 1, wherein, a limiting step and a limiting groove for mounting an air core are provided on the mounting hole in the second external thread column body.

3. A cylinder, comprising: a supporting cylinder liner, a cylinder barrel, an air core, an elastic pull rod, and the end cover assembly according to claim 1; wherein the end cover assembly is assembled to an end of the supporting cylinder liner through the first external thread column body on the cylinder cover; the air core is inserted in the mounting hole of the cylinder cover; and one end of the elastic pull rod is disposed in the mounting hole close to the air core.

4. A railway vehicle, comprising: the cylinder according to claim 3.

5. The cylinder according to claim 3, wherein the air core is configured as a stepped air core, a limiting step and a limiting groove are provided on the mounting hole in the second external thread column body, and a limiting stopper having a through hole is further provided; wherein, a stepped end of the stepped air core is limited by the limiting step, and the other end of the stepped air core is limited by the limiting stopper snapped in the limiting groove.

6. A tread cleaner, comprising:
an abrasive block;
a brake head for mounting the abrasive block; and
the cylinder according to claim 3 for driving the abrasive block to move towards a wheel tread.

7. A railway vehicle, comprising: the tread cleaner according to claim 6.

8. The tread cleaner according to claim 6, further comprising: a gap adjustment device provided on the cylinder barrel of the cylinder, wherein, the gap adjustment device comprises:
a tooth-shaped member provided with a first tooth surface meshing portion, and configured to be capable of axial relative movement relative to a piston rod of the cylinder;
a latch mechanism comprising a latch rod portion and a latch head portion, wherein, the latch head portion is provided with a second tooth surface meshing portion to be meshed with the first tooth surface meshing portion; and
a reset elastic member that acts on the latch mechanism, enabling the second tooth surface meshing portion to be meshed with the first tooth surface meshing portion;
wherein, the tooth-shaped member is provided with a first stop position and a second stop position relative to the piston rod, and at the first stop position or the second stop position, the tooth-shaped member moves towards the wheel tread together with the piston rod, or stops the piston rod from moving away from the wheel tread.

9. The tread cleaner according to claim 8, wherein, a guide groove is axially provided on the piston rod, and wherein, the first stop position and the second stop position are respectively formed at two axial ends of the guide groove, and the tooth-shaped member moves freely in the guide groove in the axial direction.

10. The tread cleaner according to claim 8, wherein, the second tooth surface meshing portion of the latch head portion comprises a plurality of tooth portions that mesh with the first tooth surface meshing portion of the tooth-shaped member in a form-fitting manner.

11. The tread cleaner according to claim 8, wherein, the latch mechanism further comprises a protruding shoulder axially connecting the latch head portion and the latch rod portion.

12. The tread cleaner according to claim 11, wherein, the reset elastic member is sleeved on the latch rod portion and sits on the protruding shoulder.

13. The tread cleaner according to claim 11, wherein, the gap adjustment device further comprises a guide element that guides the latch head portion to move under the action of the tooth-shaped member or the reset elastic member.

14. The tread cleaner according to claim 6, further comprising: a gap adjustment device provided on the cylinder barrel of the cylinder; wherein, the tread cleaner further comprises: a tooth-formed component fixedly disposed on the piston rod of the cylinder; and the gap adjustment device comprises:
a movable latch, with a latch head thereof capable of meshing with the tooth-formed component;
a latch base limited in a gap adjustment device mounting hole of the cylinder barrel; and
an elastic member for applying a down force to the latch base towards the tooth-formed component;
wherein, an upper end of the movable latch is sleeved in a guide groove of the latch base provided along the movement direction of the piston rod, and is capable of following the tooth-formed component meshed with it to move back and forth along the guide groove in the gap adjustment device mounting hole.

15. The tread cleaner according to claim 14, wherein, the latch base is configured as a component that is non-rotating relative to the gap adjustment device mounting; or the guide groove is a T-shaped groove, and the upper end of the movable latch is correspondingly configured as a T-shaped joint; or a front side face and a rear side face of the rod portion of the movable latch are configured so as to be respectively capable of forming surface contact with part of the abutted inner side wall of the gap adjustment device mounting hole.

16. The tread cleaner according to claim 14, further comprising:
a manual relief member for disengaging the movable latch from the tooth-formed component by overcoming the down force by an external force; and
a fixing bolt for mounting the inner end of the manual relief member between the upper surface of the latch base and the elastic member.

17. The tread cleaner according to claim 6, comprising: a mounting base for realizing fixed mounting of the tread cleaner; wherein, a first positioning and matching portion is provided on a bottom mounting surface of the mounting base, wherein the first positioning and matching portion is used for positioning the mounting base with respect to the tread cleaner bearing portion during the process of mounting the tread cleaner on the tread cleaner bearing portion.

18. The tread cleaner according to claim 17, wherein, in the process of mounting the tread cleaner on the tread cleaner bearing portion, the first positioning and matching portion is matched with a second positioning and matching portion) on a mounting and matching surface of the tread cleaner bearing portion, so as to prevent the tread cleaner from sliding down relative to the inclined mounting and matching surface.

19. The tread cleaner according to claim 18, wherein, the first positioning and matching portion comprises a first positioning and matching convex portion, and the second positioning and matching portion comprises a first positioning and matching concave portion provided corresponding to the first positioning and matching convex portion; wherein, the first positioning and matching convex portion at least partially protrudes into the first positioning and matching concave portion.

20. The tread cleaner according to claim 18, wherein, the first positioning and matching portion comprises a second positioning and matching concave portion, and the second positioning and matching portion comprises a second positioning and matching convex portion provided corresponding to the second positioning and matching concave portion; wherein, the second positioning and matching convex portion at least partially protrudes into the second positioning and matching concave portion.

21. A railway vehicle, comprising: the tread cleaner according to claim 17, wherein, the tread cleaner is positioned and mounted relative to a wheel tread of a wheel, and in the process of mounting the tread cleaner on a tread cleaner bearing portion, the first positioning and matching portion is matched with a second positioning and matching portion on the mounting and matching surface of the tread cleaner bearing portion, so as to prevent the tread cleaner from sliding down relative to the oblique mounting and matching surface.

22. A railway vehicle, comprising: the end cover assembly according to claim 1.

\* \* \* \* \*